US012562773B2

(12) United States Patent
Jung et al.

(10) Patent No.: US 12,562,773 B2
(45) Date of Patent: Feb. 24, 2026

(54) INTELLIGENT SIGNAL TRANSMISSION OR RECEPTION METHOD AND DEVICE THEREFOR

(71) Applicant: LG ELECTRONICS INC., Seoul (KR)

(72) Inventors: Ikjoo Jung, Seoul (KR); Ilhwan Kim, Seoul (KR); Jongku Lee, Seoul (KR); Sunam Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 320 days.

(21) Appl. No.: 18/270,460

(22) PCT Filed: Dec. 29, 2020

(86) PCT No.: PCT/KR2020/095156
§ 371 (c)(1),
(2) Date: Jun. 29, 2023

(87) PCT Pub. No.: WO2022/145551
PCT Pub. Date: Jul. 7, 2022

(65) Prior Publication Data
US 2024/0063840 A1 Feb. 22, 2024

(51) Int. Cl.
*H04B 1/401* (2015.01)
*H04B 1/16* (2006.01)
*H04B 17/336* (2015.01)

(52) U.S. Cl.
CPC ........... *H04B 1/401* (2013.01); *H04B 1/1638* (2013.01); *H04B 17/336* (2015.01)

(58) Field of Classification Search
CPC .... H04B 1/401; H04B 1/1638; H04B 17/336; H04B 1/06; G06N 20/00; H04W 8/24; H04W 72/51
See application file for complete search history.

(56) References Cited

U.S. PATENT DOCUMENTS

2019/0364433 A1 11/2019 Das

FOREIGN PATENT DOCUMENTS

| CN | 208956027 | 6/2019 |
| KR | 1020180106789 | 10/2018 |

(Continued)

OTHER PUBLICATIONS

English translation of CN208956027U (Year: 2019).*

(Continued)

*Primary Examiner* — Matthew D. Anderson
(74) *Attorney, Agent, or Firm* — LEE, HONG, DEGERMAN, KANG & WAIMEY

(57) ABSTRACT

An intelligent computing device according to an embodiment of the present specification may receive a request for terminal information related to a terminal from a base station, transmit the terminal information to the base station, receive a resource for data transmission or reception, which is allocated by the base station, and transmit or receive data to or from the base station by using the allocated resource, wherein the data is transmitted or received by using a receiver selected from among a normal receiver of the terminal and an artificial intelligence receiver of the terminal on the basis of wireless communication environment information of the terminal, so that the conventional normal receiver and the artificial intelligence receiver provided at the terminal can be efficiently used in a wireless communication environment. One or more of a base station, a terminal, an intelligent computing device, and a server of the present specification may be associated with an artificial intelligence module, a drone (unmanned aerial vehicle; UAV), a robot, an augmented reality (AR) device, a virtual reality (VR) device, a device related to a 5G service, etc.

13 Claims, 22 Drawing Sheets

(56)         References Cited

FOREIGN PATENT DOCUMENTS

| KR | 1020190094129 | 8/2019 |
| KR | 1020190103084 | 9/2019 |
| KR | 102030128 | 11/2019 |
| KR | 1020200132627 | 11/2020 |

OTHER PUBLICATIONS

English translation of KR20180106789A (Year: 2018).*
English translation of KR20200132627A (Year: 2020).*
Korean Intellectual Property Office Application No. 10-2023-7024394, Office Action dated Nov. 20, 2024, 7 pages.
PCT International Application No. PCT/KR2020/095156, International Search Report dated Sep. 7, 2021, 4 pages.

* cited by examiner

[FIG. 1]
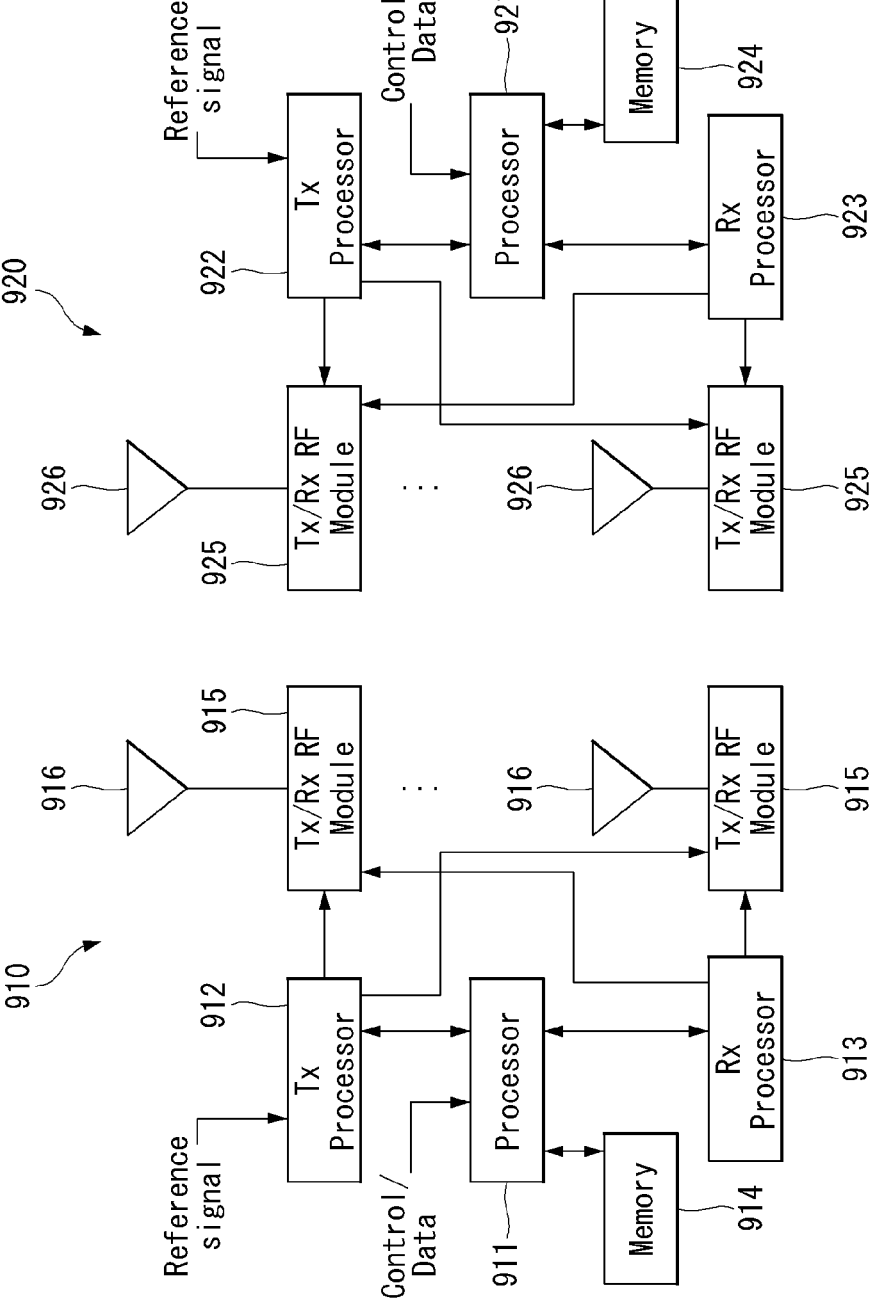

[FIG. 2]
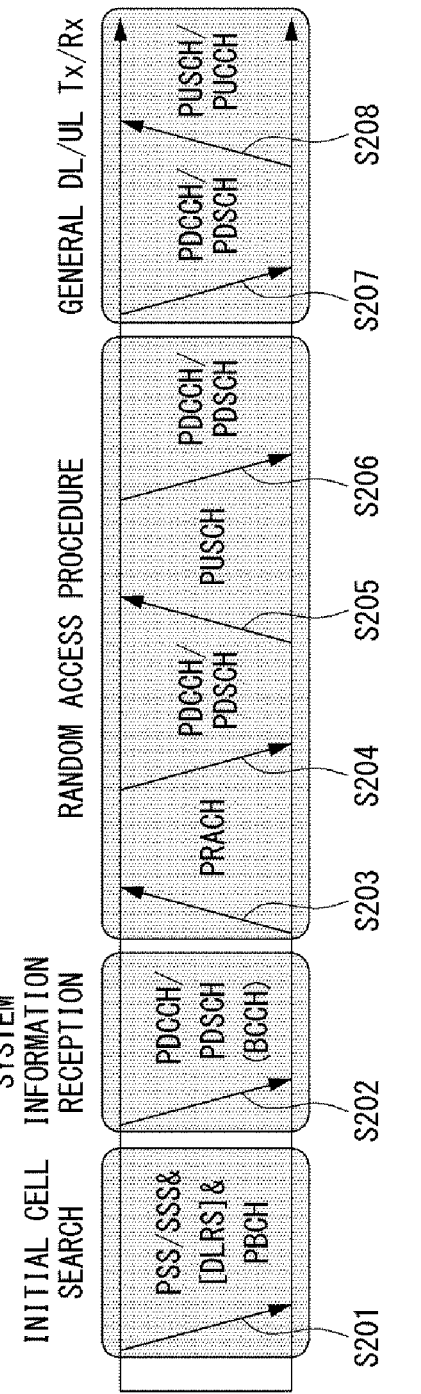

【FIG. 3】
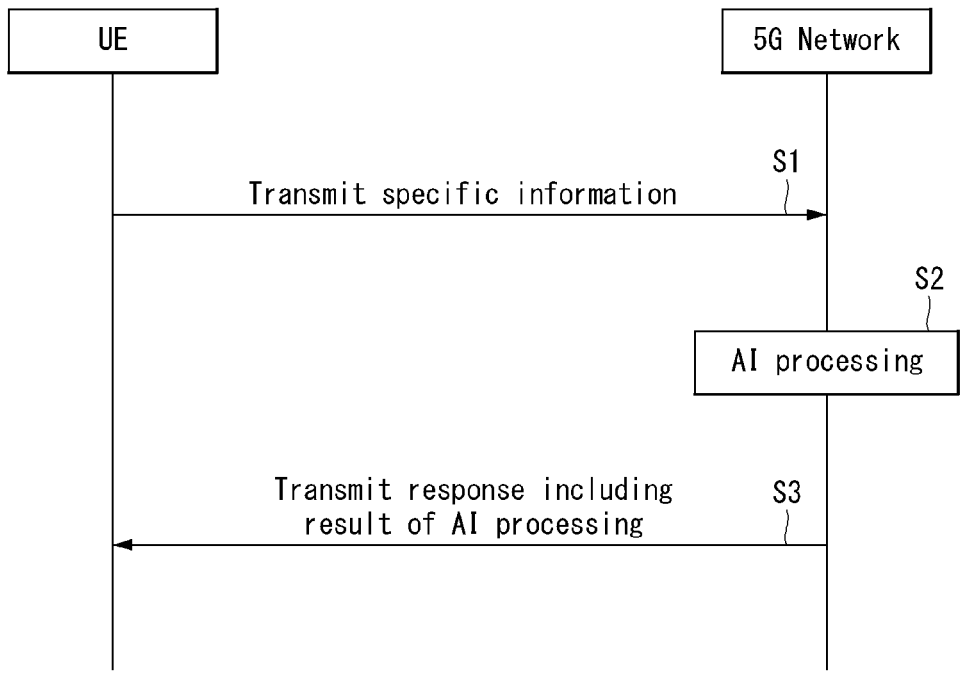
【FIG. 4】
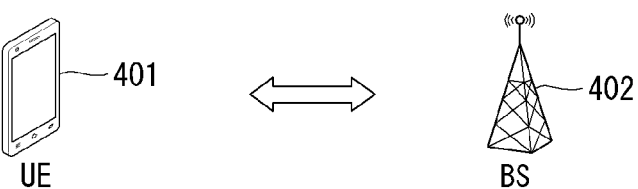

【FIG. 5】
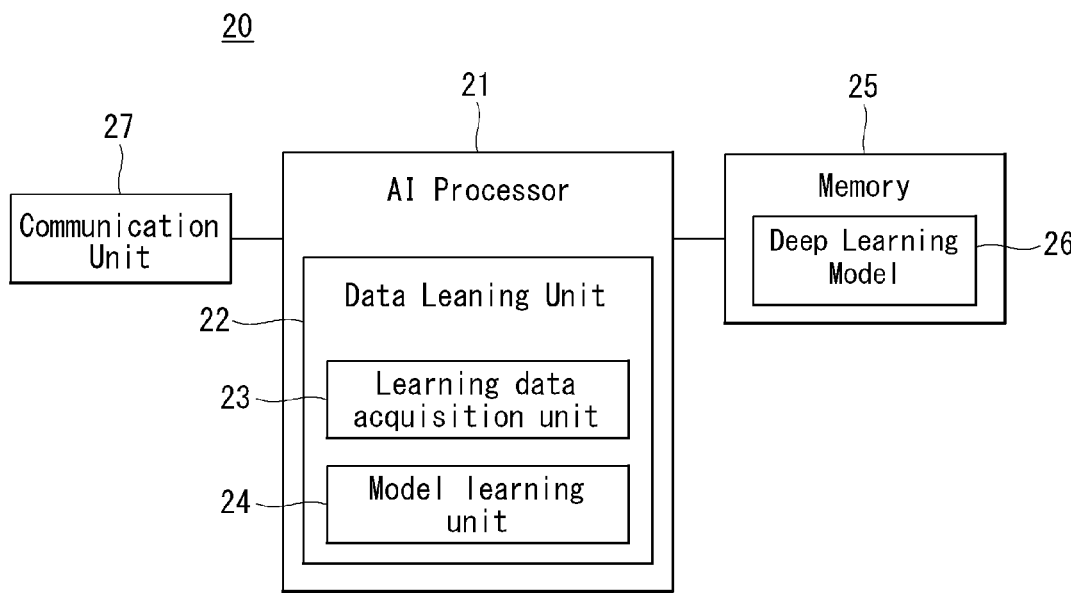

【FIG. 6】
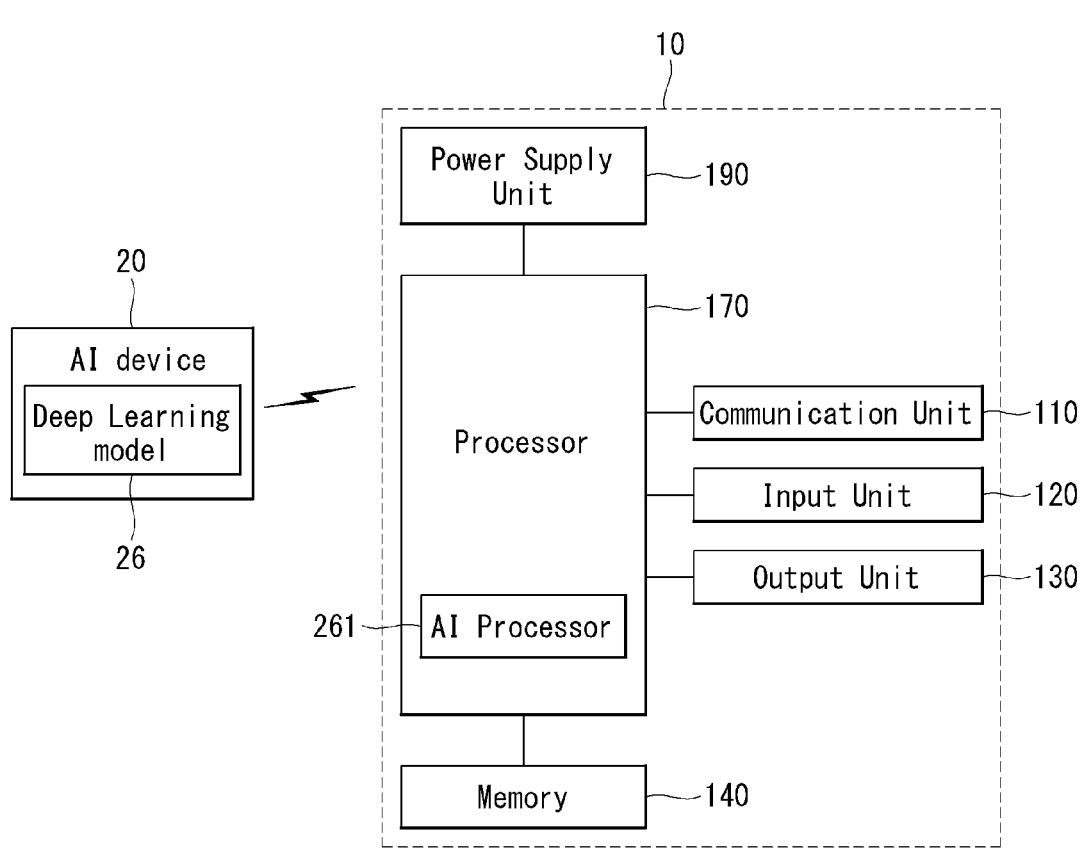

【FIG. 7】
<u>S700</u>
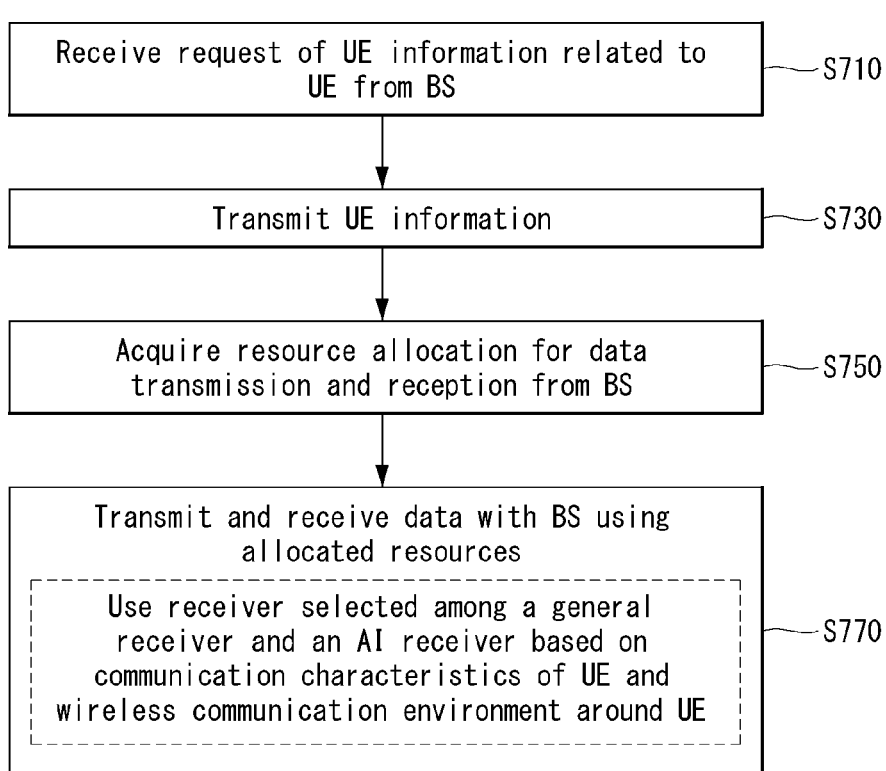

【FIG. 8】
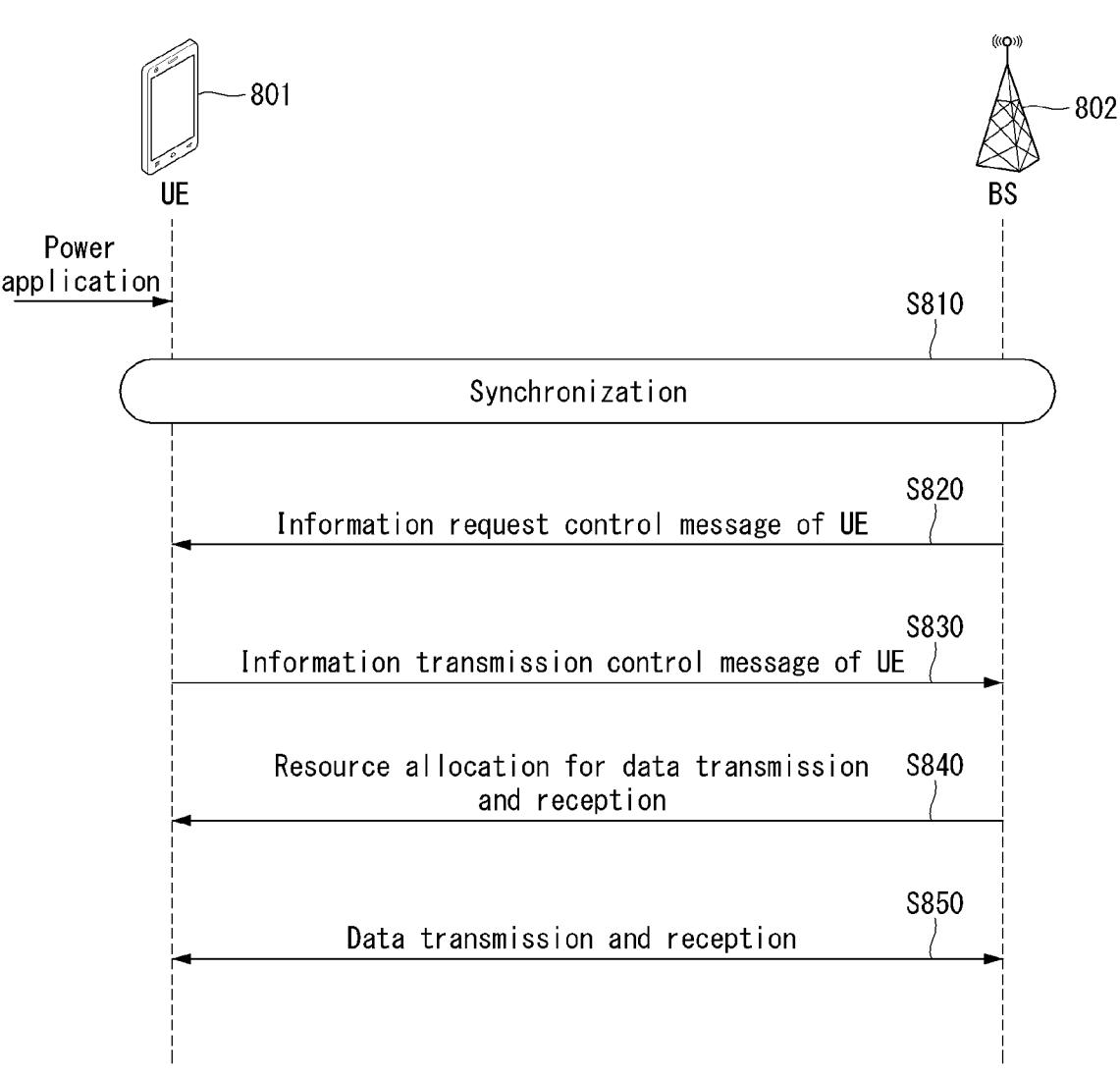

【FIG. 9】
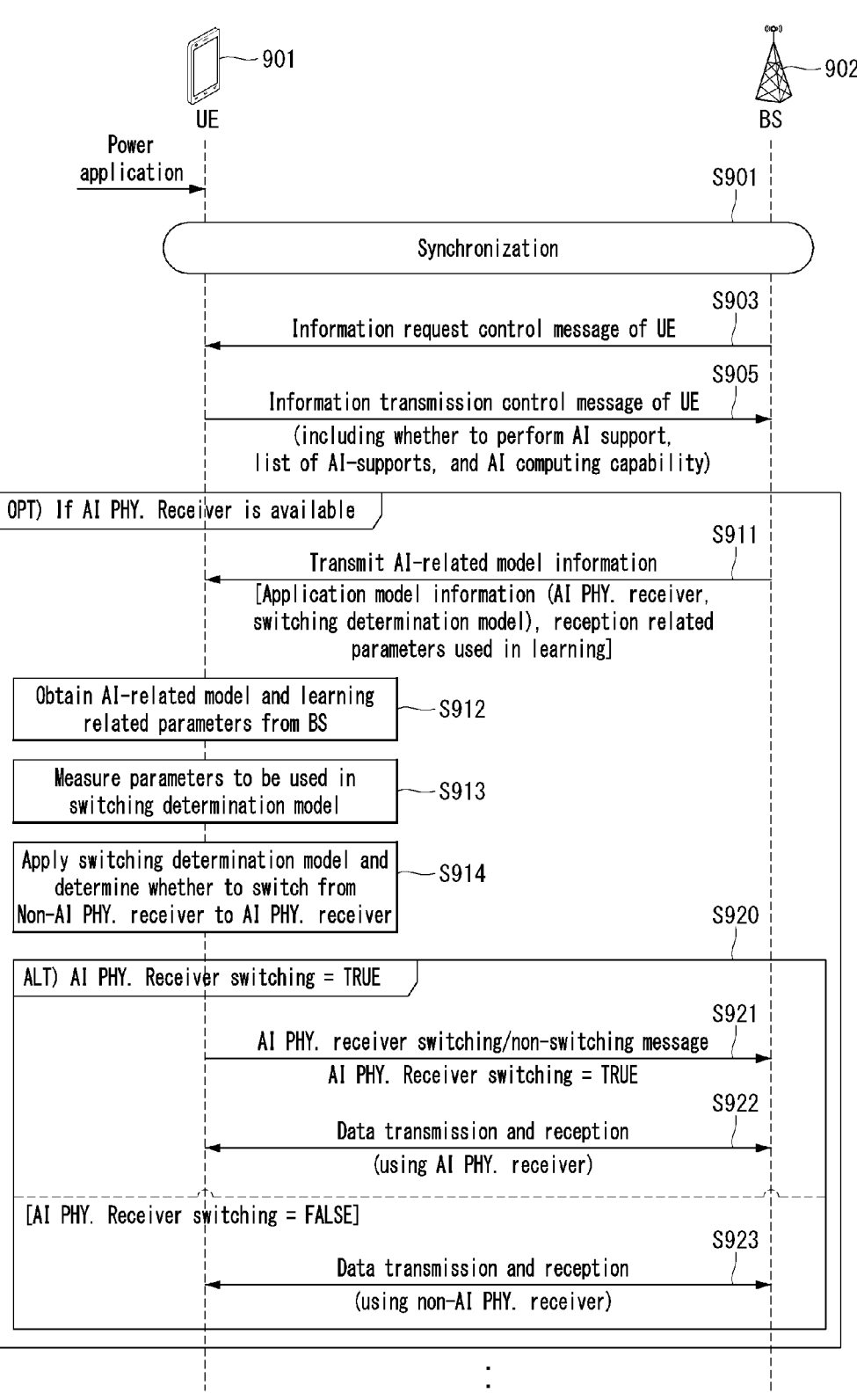

[FIG. 10]
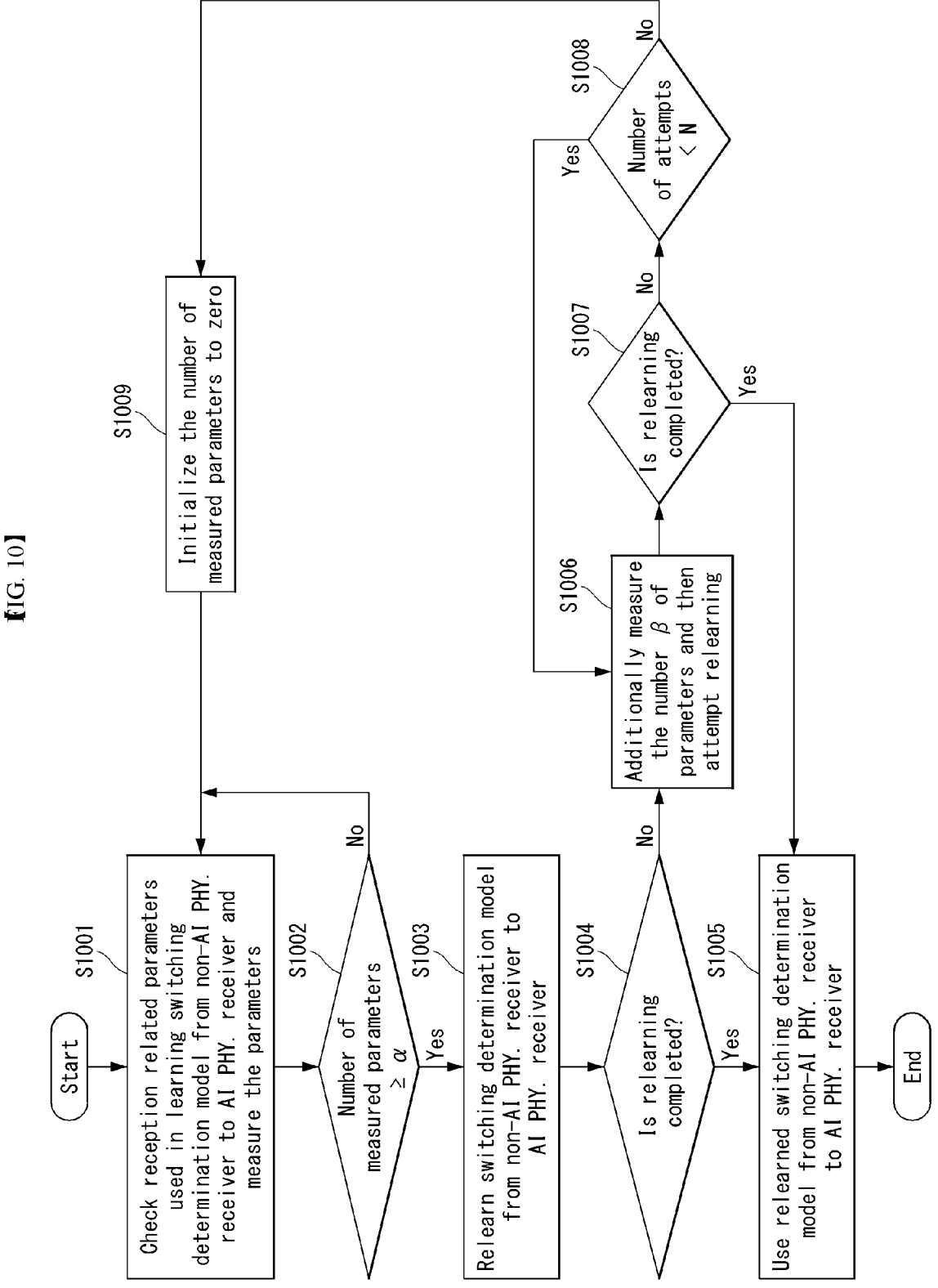

【FIG. 11】
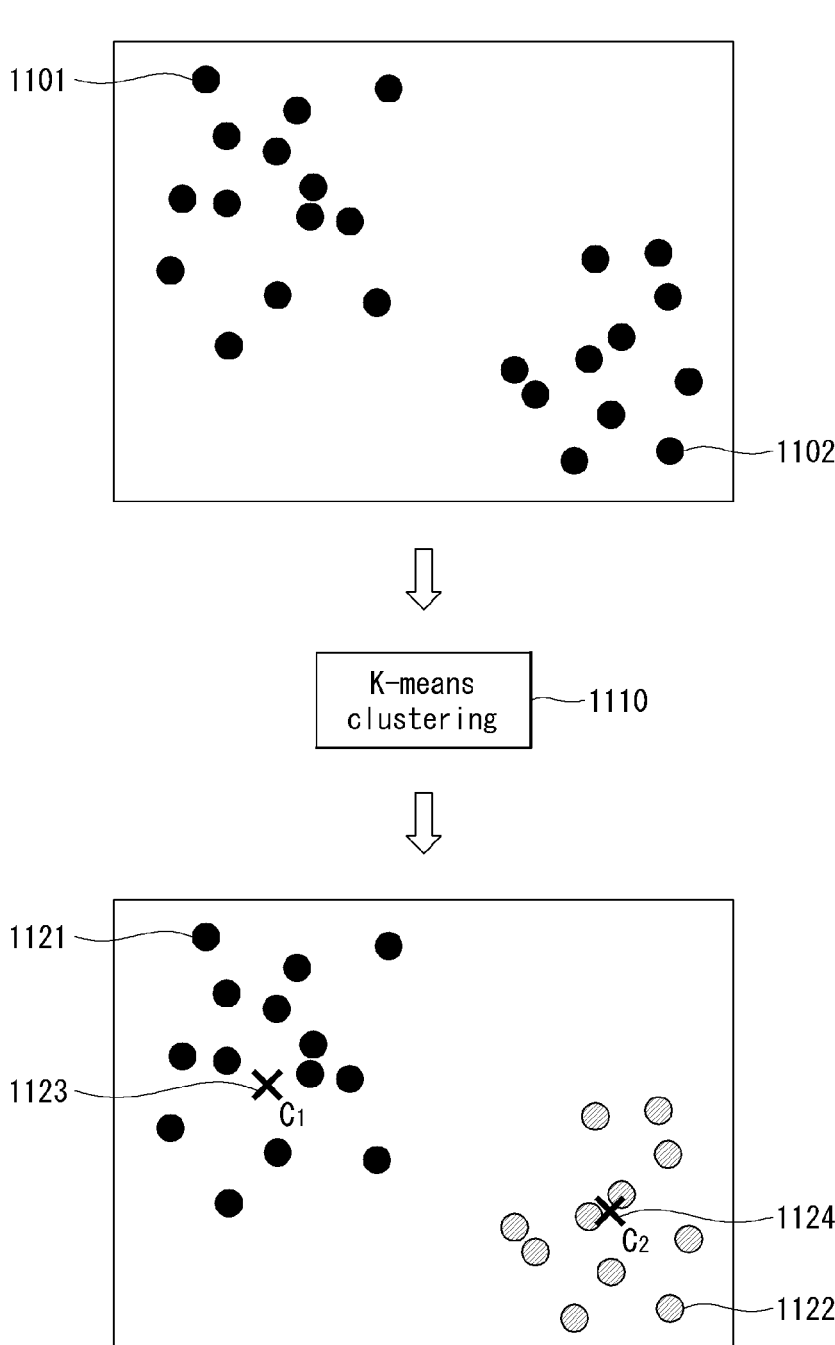

【FIG. 12】
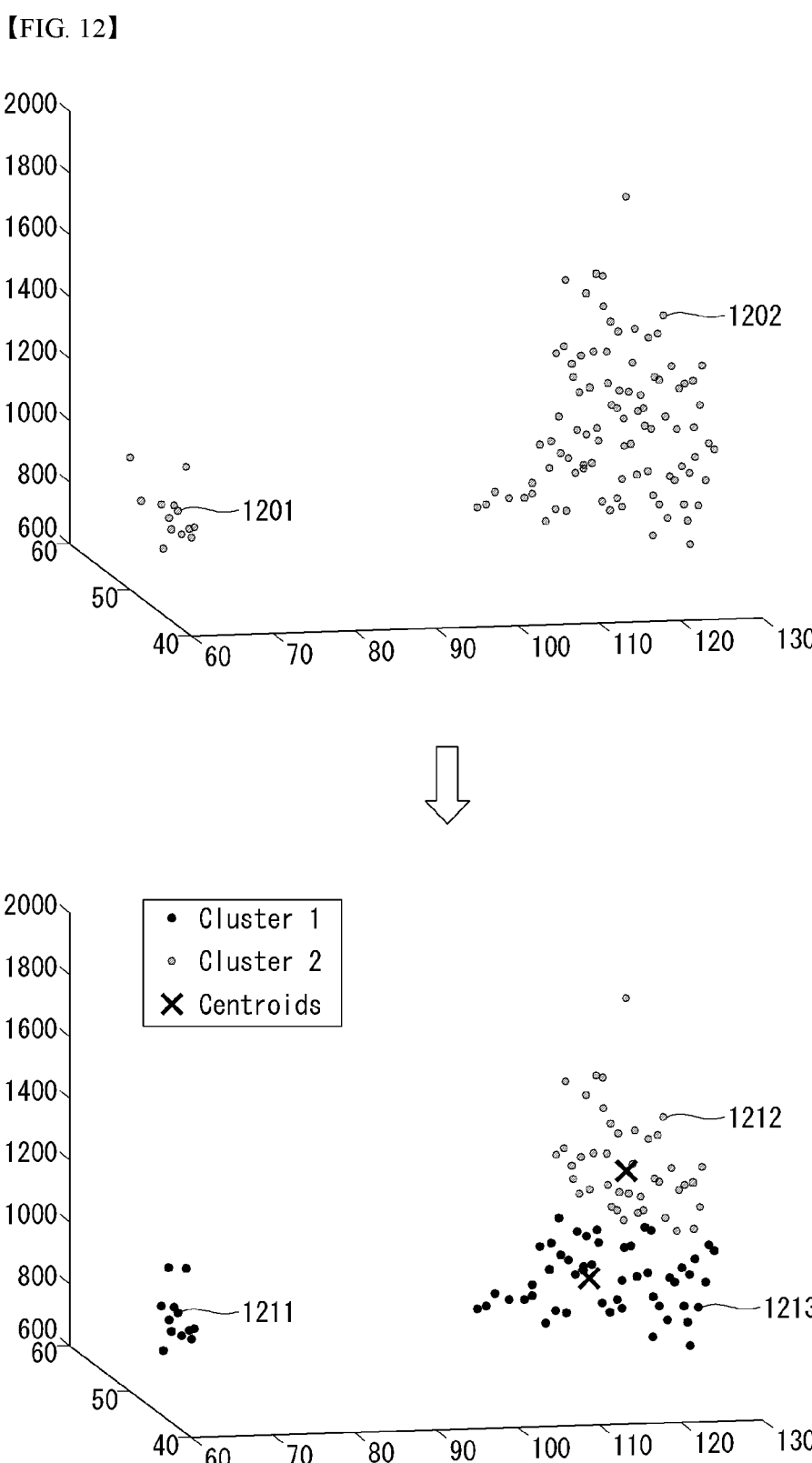

【FIG. 13】
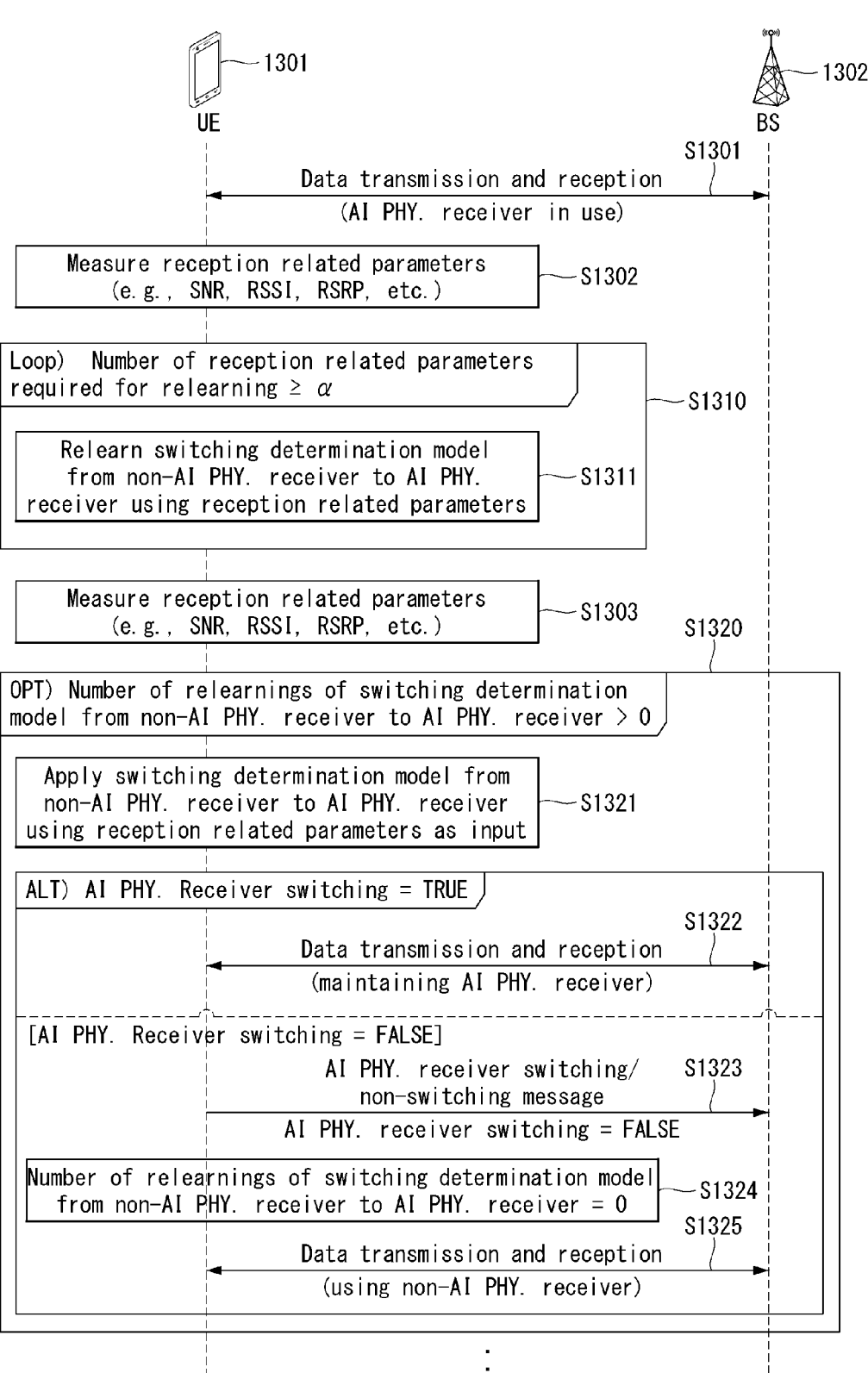

【FIG. 14】
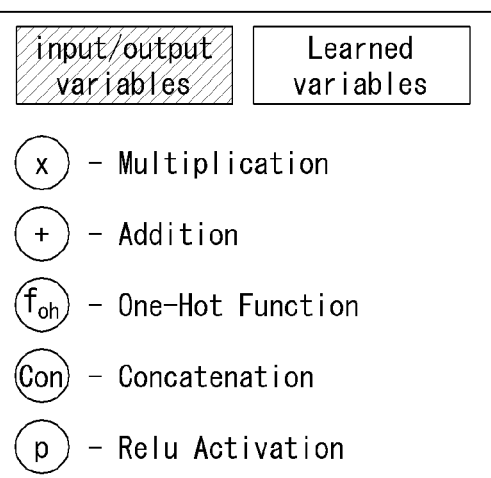
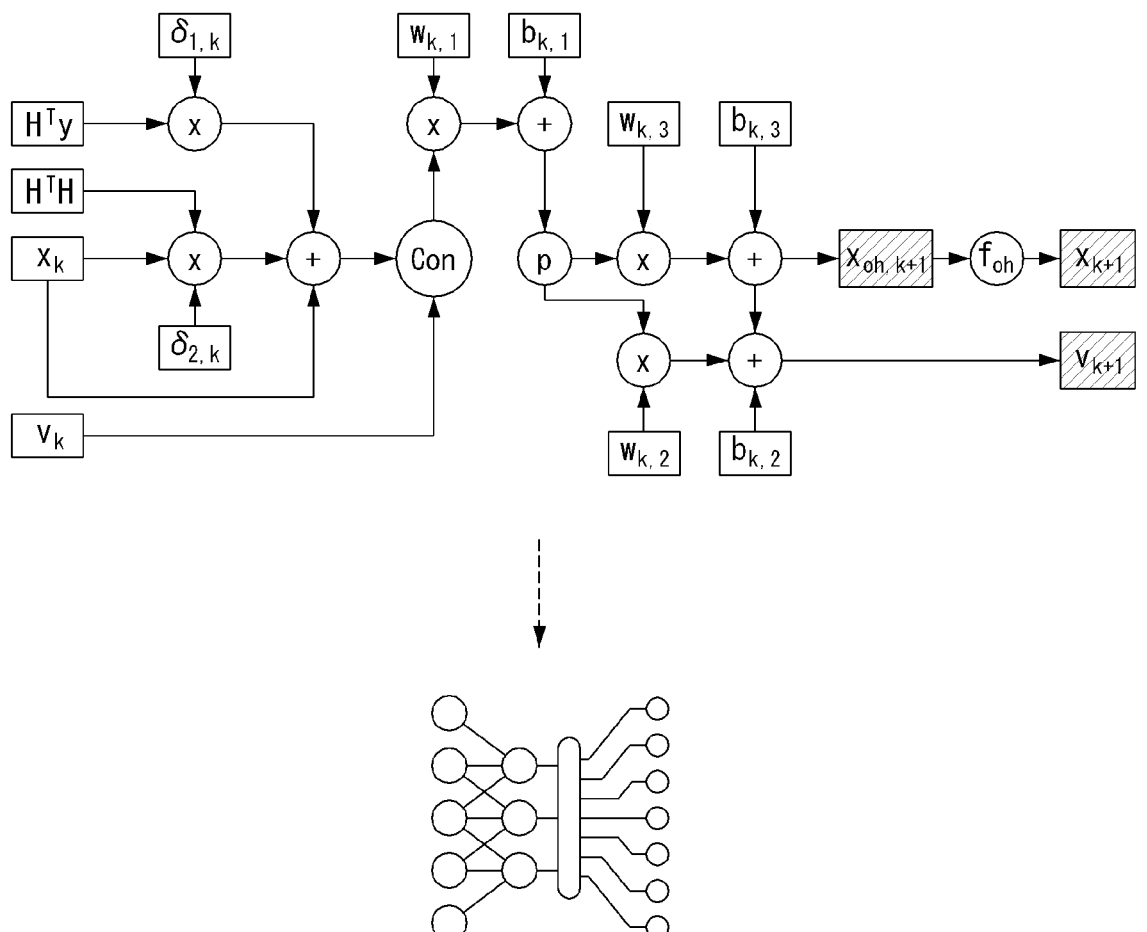

【FIG. 15】
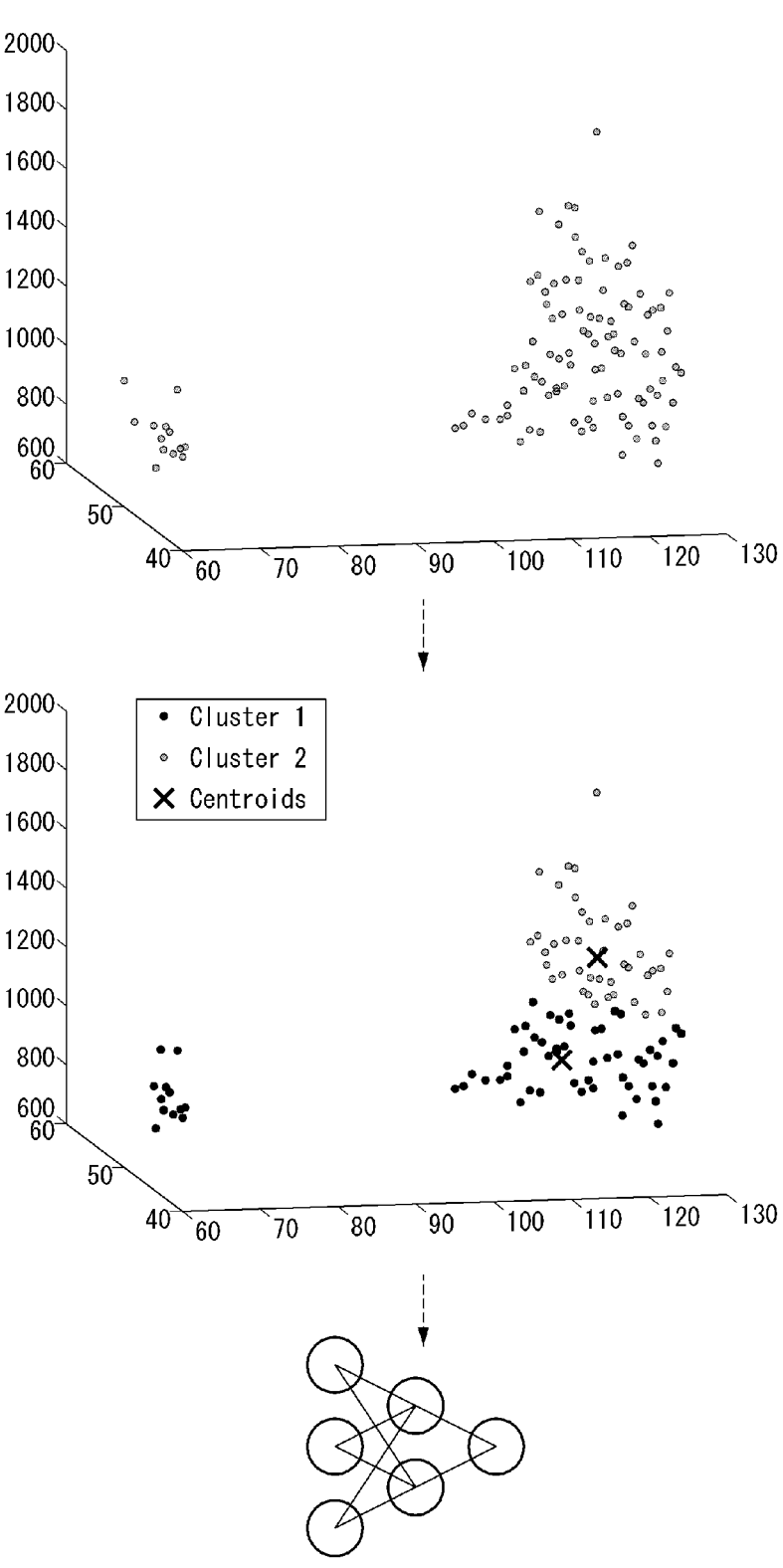

【FIG. 16】
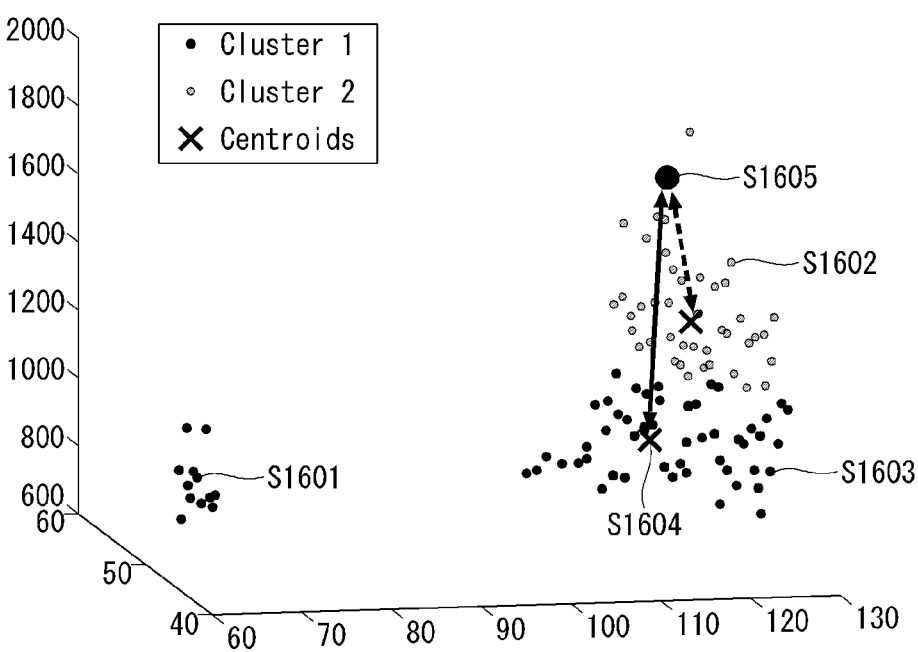

【FIG. 17】
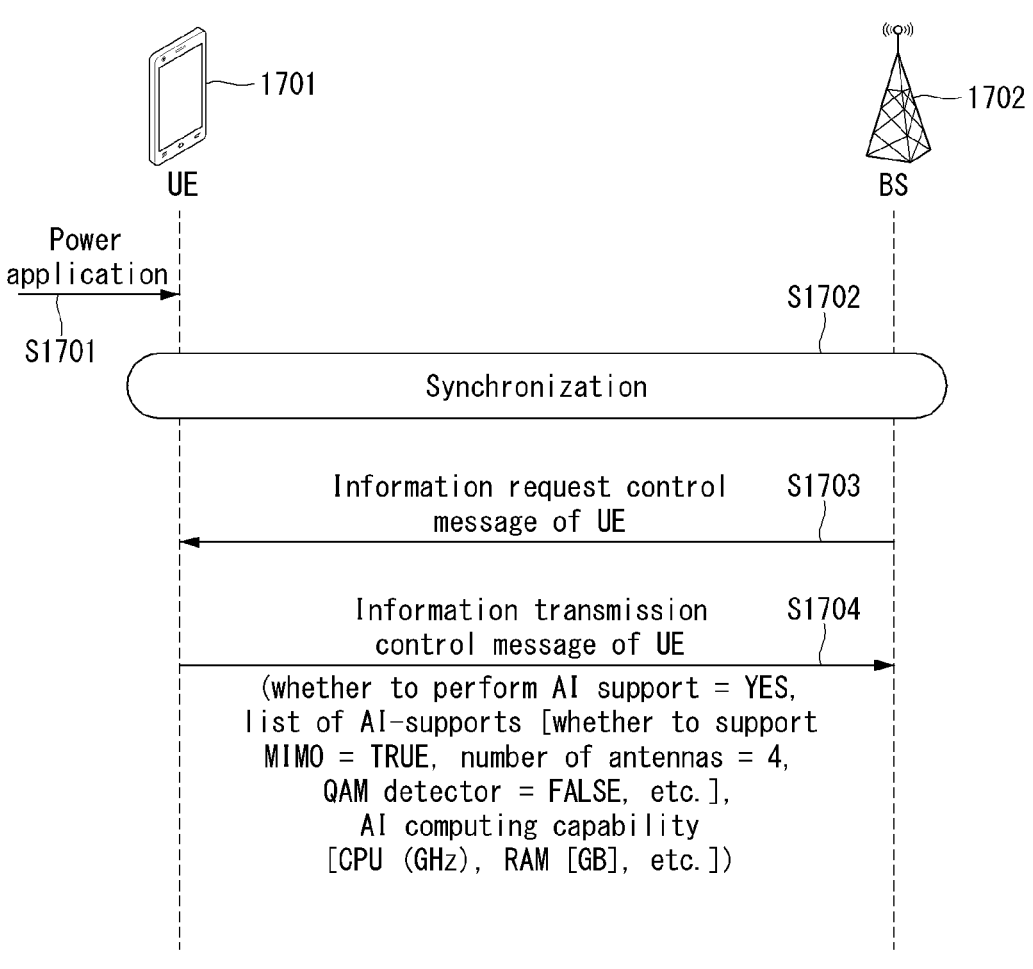

【FIG. 18】
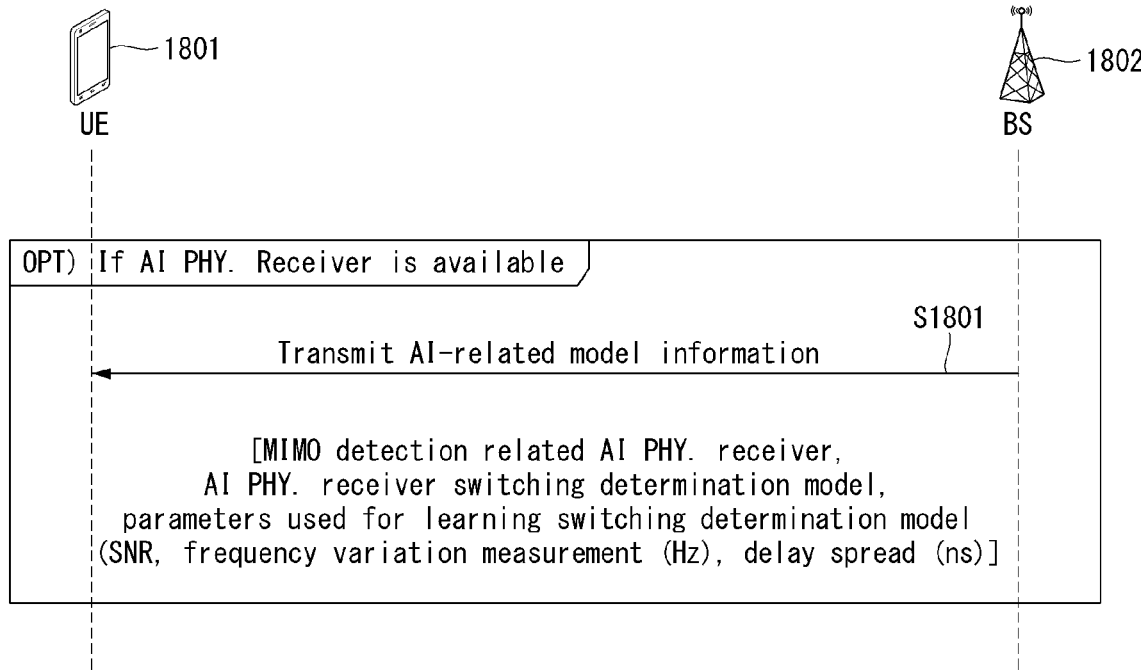

【FIG. 19】
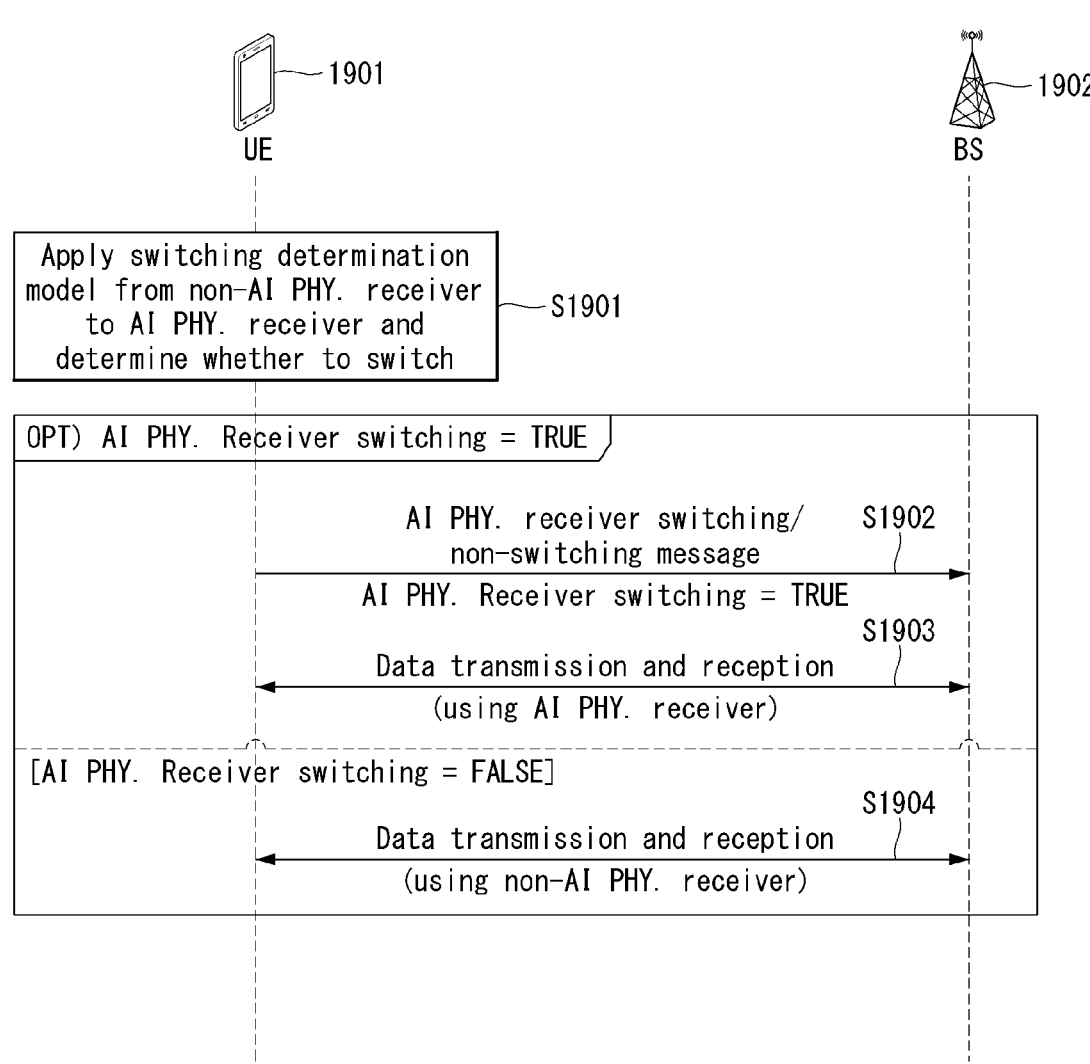

【FIG. 20】
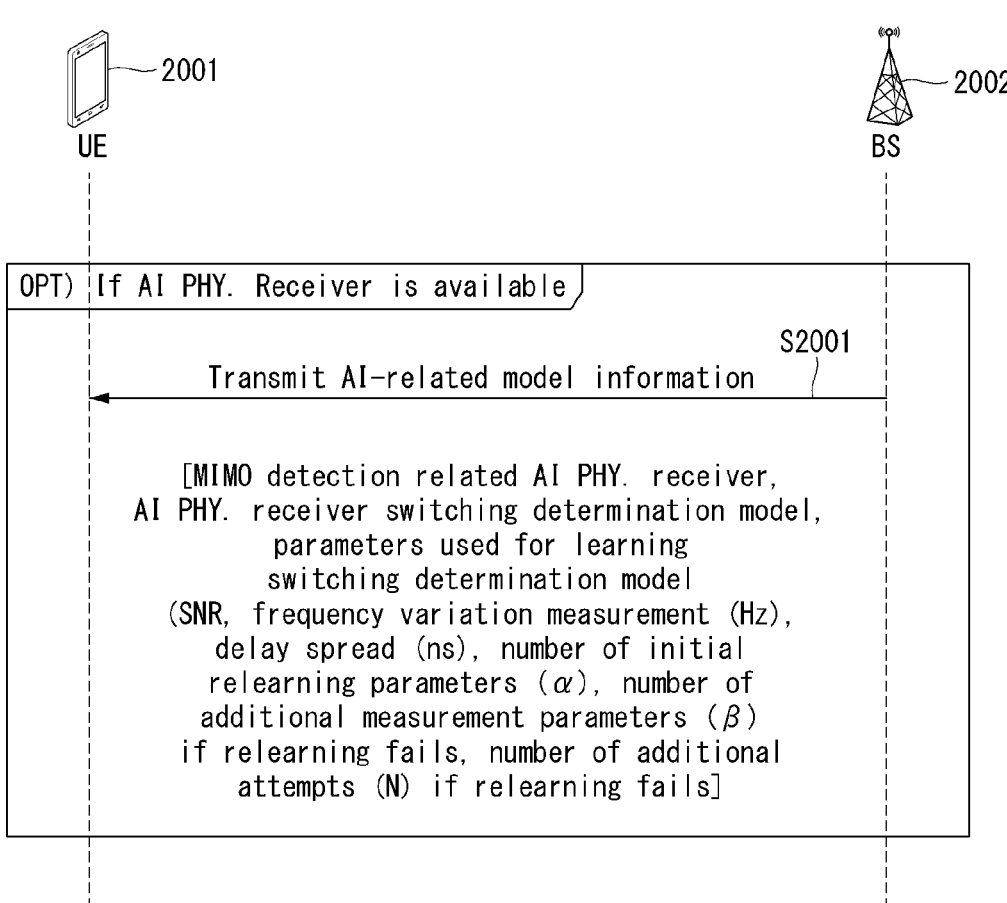

【FIG. 21】
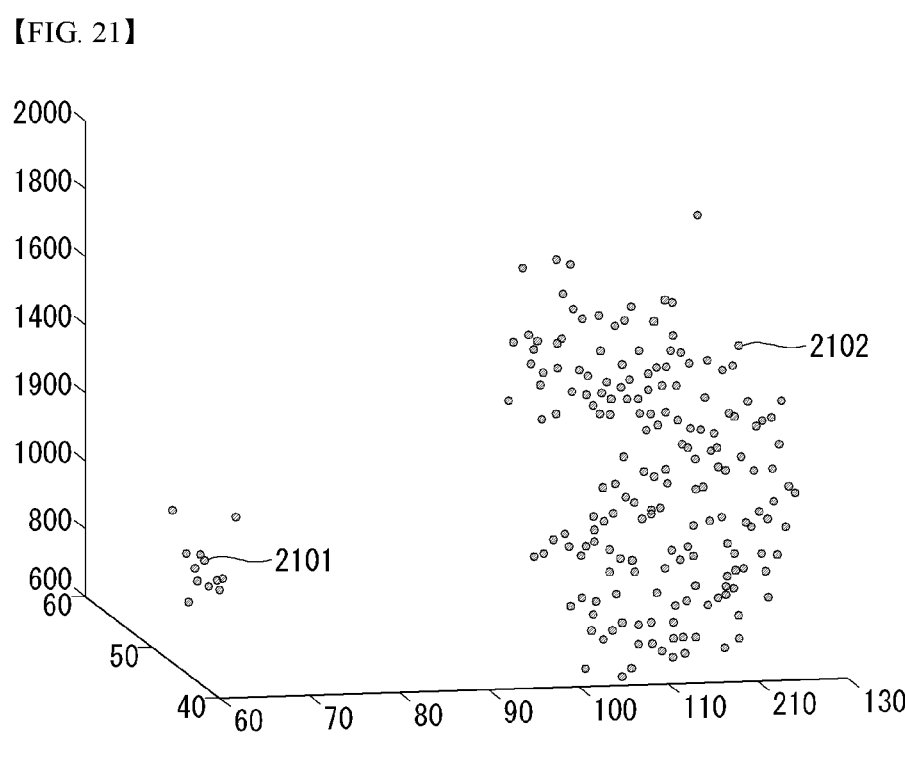
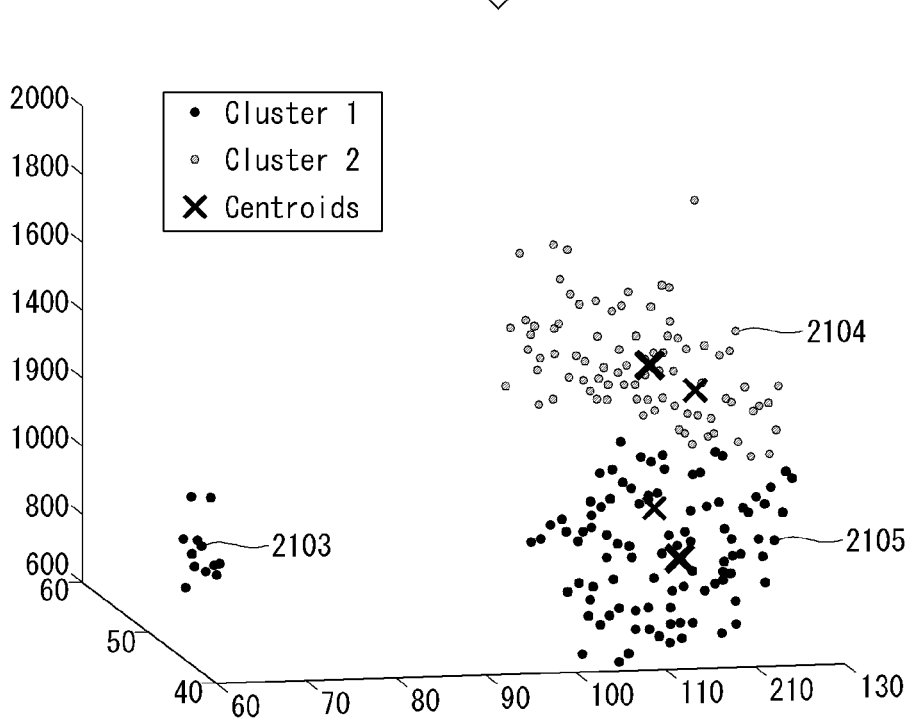

【FIG. 22】
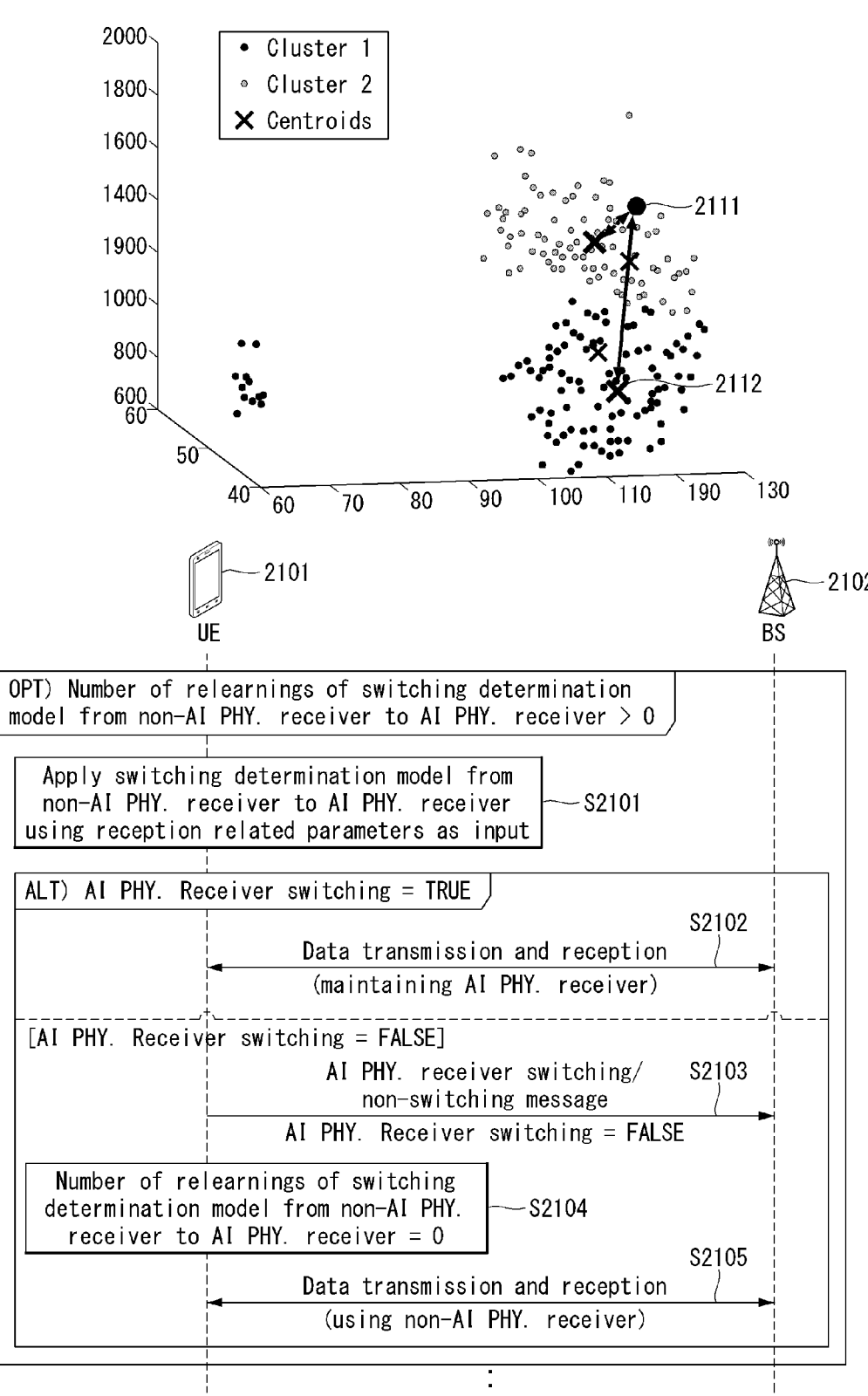

【FIG. 23】
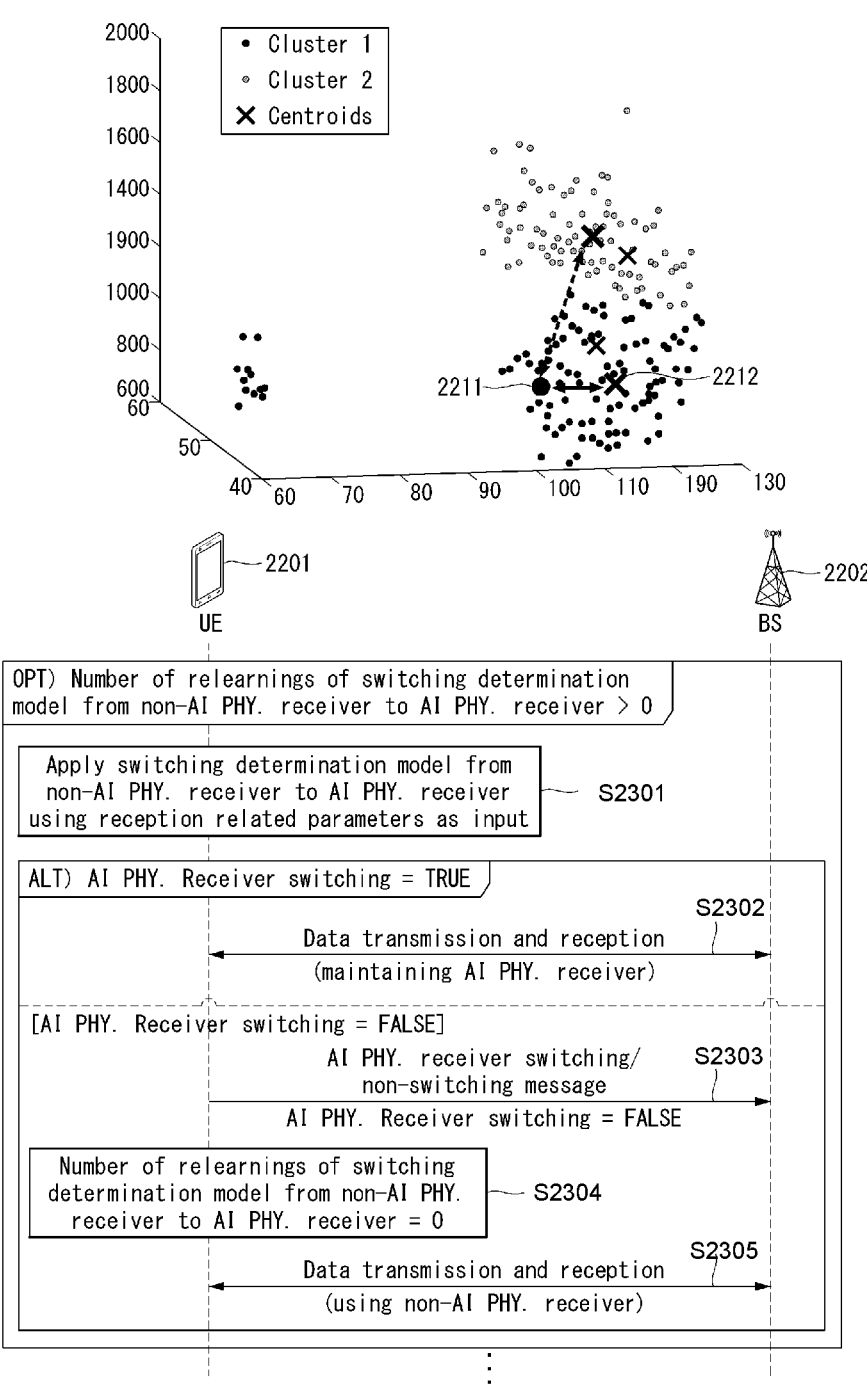

INTELLIGENT SIGNAL TRANSMISSION OR RECEPTION METHOD AND DEVICE THEREFOR

CROSS-REFERENCE TO RELATED APPLICATIONS

This application is the National Stage filing under 35 U.S.C. 371 of International Application No. PCT/KR2020/095156, filed on Dec. 29, 2020, the contents of which are all incorporated by reference herein in their entireties.

TECHNICAL FIELD

The present disclosure relates to a method of transmitting and receiving an intelligent signal and an intelligent computing device therefor, and more particularly to a method of transmitting and receiving a signal by selecting among a general receiver and an artificial intelligence receiver and an intelligent computing device therefor.

BACKGROUND ART

Recently, as artificial intelligence (AI) technology has been developed, the AI technology is being used to transmit and receive signals between a receiver of a user equipment (UE) and a base station in a wireless communication environment.

In particular, the AI technology requires machine learning and deep learning. Learning-related factors for the machine learning/deep learning include a use algorithm (e.g., DNN, CNN, RNN, etc.), the number of inputs/outputs, weights/bias, the number of layers, the number of nodes per layer, and an activation function to be applied per layer (e.g., sigmoid, ReLU, etc.).

For example, the machine learning/deep learning that is a method for implementing artificial intelligence aims to build a system capable of predicting a result for any input by learning responses to various inputs in a direction of minimizing a loss function which is a difference between an actual value and a predicted value.

Specifically, in a receiver of the physical layer to which the AI technology is applied, in case of MIMO detection, research is being carried out to implement a receiver with performance close to maximum likelihood detector (MLD) with low complexity by applying machine learning/deep learning, and to improve performance by applying AI to the existing PHY. receiver in the form of performing channel estimation and data recovery by reducing overhead such as a pilot symbol in an OFDM system.

Research is also being carried out on methods and procedures to apply various technologies for grafting AI to the physical layer of wireless communication when operating an existing general receiver and the above receiver to which artificial intelligence is applied. For example, the UE receives a model learned from the base station, the UE or the base station triggers an operation, and the AI technology performs switching from an AI receiver to the existing receiver based on an offset given by the base station. However, for switching from the existing general receiver to the AI receiver and switching from the AI receiver to the general receiver, it is necessary to properly establish a switching criterion based on reception related parameters (e.g., SNR, RSRP, BLER, etc.) according to a channel environment. In particular, a procedure is required to determine the switching between the receivers. This procedures determines the switching between the receivers by making and applying a switching determination model through machine learning for various reception related parameters, and by relearning the switching determination model and making it into a switching determination model specialized for the UE.

DISCLOSURE

Technical Problem

An object of the present disclosure is to address the above-described and other problems.

Another object of the present disclosure is to implement a method of transmitting and receiving a signal through a switching between a general receiver and an artificial intelligence receiver based on pre-determined switching criteria.

Technical Solution

In one aspect of the present disclosure, there is provided a method of a user equipment (UE) for receiving an intelligent signal from a base station (BS), the method comprising receiving, from the BS, a request of UE information related to the UE; transmitting, to the BS, the UE information; allocating, by the BS, a resource for data transmission and reception; and transmitting and receiving data with the BS based on the allocated resource, wherein transmitting and receiving the data comprises transmitting and receiving the data based on a receiver selected among a general receiver of the UE and an artificial intelligence (AI) receiver of the UE based on wireless communication environment information of the UE.

The wireless communication environment information of the UE may include at least one of SNR information, frequency variation measurement information, or delay spread information of the UE.

The method may further comprise, based on it being determined that the UE is able to use the AI receiver, transmitting, to the BS, a request of AI-related model information, and receiving, from the BS, the AI-related model information.

The request of the AI-related model information may include at least one of information for whether to perform an AI support, information for a list of AI supports, and information for an AI computing capability.

The AI-related model information may include at least one of a switching determination model, and reception related parameters used for learning.

The method may further comprise, after receiving the AI-related model information, measuring parameters used in a switching determination model, and selecting one among the general receiver and the AI receiver based on the measured parameters and the switching determination model.

Based on a number of the measured parameters being less than or equal to a preset threshold, measuring the parameters may be repeated.

The method may further comprise, based on the number of the measured parameters being greater than the preset threshold, relearning the switching determination model.

The method may further comprise, based on the relearning being completed, adding parameters as many as a preset number of parameters and measuring the parameters.

Based on the additional measurement being completed, the relearning may be repeated by a preset number of reattempts.

In another aspect of the present disclosure, there is provided an intelligent computing device for intelligently receiving a signal from a base station (BS), the intelligent computing device comprising a communication unit configured to receive, from the BS, a request of user equipment (UE) information related to a UE; and a processor configured to transmit the UE information to the BS through the communication unit, allow the BS to allocate a resource for data transmission and reception, and transmit and receive data with the BS based on the allocated resource, wherein the processor is further configured to transmit and receive the data based on a receiver selected among a general receiver of the UE and an artificial intelligence (AI) receiver of the UE based on wireless communication environment information of the UE.

The wireless communication environment information of the UE may include at least one of SNR information, frequency variation measurement information, or delay spread information of the UE.

Based on it being determined that the UE is able to use the AI receiver, the processor is further configured to transmit, to the BS, a request of AI-related model information, and receive, from the BS, the AI-related model information.

The request of the AI-related model information may include at least one of information for whether to perform an AI support, information for a list of AI supports, and information for an AI computing capability.

The AI-related model information may include at least one of a switching determination model, and reception related parameters used for learning.

The processor may be further configured to, after receiving the AI-related model information, measure parameters used in a switching determination model, and select one among the general receiver and the AI receiver based on the measured parameters and the switching determination model.

The processor may be further configured to, based on a number of the measured parameters being less than or equal to a preset threshold, repeat the measurement of the parameters.

The processor may be further configured to, based on the number of the measured parameters being greater than the preset threshold, relearn the switching determination model.

The processor may be further configured to, based on the relearning being completed, add parameters as many as a preset number of parameters and measure the parameters.

In another aspect of the present disclosure, there is provided a method of a user equipment (UE) for receiving an intelligent signal from a base station (BS), the method comprising receiving, from the BS, a request of UE information; transmitting, to the BS, the UE information; allocating, by the BS, a resource for data transmission and reception; and transmitting and receiving data with the BS based on a general physical receiver of the UE through the allocated resource, wherein transmitting and receiving the data comprises determining whether to switch from the general physical receiver to an artificial intelligence (AI) receiver based on wireless communication environment information of the UE; and switching from the general physical receiver to the AI receiver based on a result of determination.

Advantageous Effects

Effects of a method of transmitting and receiving an intelligent signal according to an embodiment of the present disclosure are described below.

The present disclosure can efficiently use an existing general receiver and an AI receiver included in a UE in a wireless communication environment.

The present disclosure can have a specialized model compared to the existing model by including a receiver switching determination model suitable for a UE based on reception parameters reflecting a receiver implemented for each UE and a wireless environment for a current location.

The present disclosure can improve reception performance of a UE by selecting one of an existing receiver and an AI receiver based on a model specialized for a wireless environment.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

Accompanying drawings included as a part of the detailed description for helping understand the present disclosure provide embodiments of the present disclosure and are provided to describe technical features of the present disclosure with the detailed description.

FIG. 1 is a block diagram of a wireless communication system to which methods proposed in the disclosure are applicable.

FIG. 2 shows physical channels and general signal transmission used in a 3GPP system.

FIG. 3 shows an example of basic operations of an user equipment and a 5G network in a 5G communication system.

FIG. 4 illustrates a UE and a base station according to an embodiment of the present disclosure.

FIG. 5 is a block diagram of an AI device applicable to embodiments of the present disclosure.

FIG. 6 is an exemplary block diagram of an intelligent computing device according to an embodiment of the present disclosure.

FIG. 7 is a flow chart illustrating a method of transmitting and receiving an intelligent signal according to an embodiment of the present disclosure.

FIG. 8 illustrates a connection establishment procedure between a UE and a base station according to an embodiment of the present disclosure.

FIG. 9 is a flow chart illustrating an initial receiver switching operation procedure according to an embodiment of the present disclosure.

FIG. 10 is a flow chart illustrating a procedure, in which a UE switches to an AI receiver and then relearns a model, according to an embodiment of the present disclosure.

FIG. 11 illustrates a basic example of K-means clustering.

FIG. 12 illustrates arrangement of parameters measured along the x-y-z axes.

FIG. 13 is a flow chart illustrating a procedure, in which a UE switches to an AI receiver and then performs relearning, according to another embodiment of the present disclosure.

FIG. 14 illustrates a process of generating an AI receiver model.

FIG. 15 illustrates a process of generating a switching determination model between an AI receiver and a general receiver.

FIG. 16 illustrates one clustering to which a switching determination model according to the present disclosure is applied.

FIG. 17 illustrates UE information according to the present disclosure.

FIG. 18 illustrates AI-related model information according to the present disclosure.

FIG. 19 is a flow chart illustrating an operating based on a switching determination result according to the present disclosure.

FIG. 20 illustrates an example where a base station transmits AI-related model information to a UE.

FIG. 21 illustrates a cluster whose a centroid is changed after relearning.

FIG. 22 is a flow chart illustrating an example of an operation of a UE after relearning.

FIG. 23 is a flow chart illustrating another example of an operation of a UE after relearning.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 shows physical channels and general signal transmission used in a 3GPP system.

In a wireless communication system, UE receives information from a base station through downlink (DL), and the UE transmits information to the base station through uplink (UL). Information transmitted and received between the base station and the UE includes data and various control information, and various physical channels exist according to the type/use of the information transmitted and received by the base station and the UE.

When a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state.

After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH. In the case of a contention-based RACH, a contention resolution procedure may be additionally performed (S206).

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The DCI may include control information such as resource allocation information for the UE, and different formats of the DCI may be applied depending on the purpose of use.

Control information that the UE transmits to the base station through uplink or receives from the base station may include downlink/uplink ACK/NACK signal, channel quality indicator (CQI), precoding matrix index (PMI), rank indicator (RI), and the like. The UE may transmit the control information such as the CQI/PMI/RI through PUSCH and/or PUCCH.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-S SB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL Tx beam (spatial domain transmission filters) of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management' from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3)

extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols)

indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of trans- mission of the specific information and the specific infor- mation may be repeatedly transmitted on the basis of the information on the number of repetitions. That is, the autonomous vehicle transmits the specific information to the 5G network on the basis of the UL grant. Repetitive trans- mission of the specific information may be performed through frequency hopping, the first transmission of the specific information may be performed in a first frequency resource, and the second transmission of the specific infor- mation may be performed in a second frequency resource. The specific information can be transmitted through a nar- rowband of 6 resource blocks (RBs) or 1 RB.

The above-described 5G communication technology can be combined with methods proposed in the present disclo- sure which will be described later and applied or can complement the methods proposed in the present disclosure to make technical features of the methods concrete and clear.

FIG. 4 illustrates a UE and a base station according to an embodiment of the present disclosure.

A base station 30 may include at least a partial configu- ration of the first communication device 910 or the second communication device 920 of FIG. 1. The base station 30 may perform at least a partial function of the 5G network of FIG. 3.

An intelligent computing device 10 may include at least a partial configuration of the first communication device 910 or the second communication device 920 of FIG. 1. Further, the intelligent computing device 10 may perform at least a partial function of the UE of FIG. 3.

As illustrated in FIG. 4, the base station may transmit signals to a plurality of intelligent computing devices. The base station may transmit the signals to each of the plurality of intelligent computing devices using a pre-selected best beam among a plurality of candidate beams.

The intelligent computing device may receive the signal from the base station. The intelligent computing device may receive the signal from the base station using a pre-selected best beam among a plurality of candidate beams.

FIG. 5 is a block diagram of an AI device applicable to embodiments of the present disclosure.

At least a partial configuration of an AI device 20 may be included in the UE described above with reference to FIGS. 1 to 3.

The AI device 20 may include an electronic device including an AI module that can perform AI processing, or a server including the AI module, and the like. The AI device 20 may be included as at least a partial configuration of the intelligent computing device 10 illustrated in FIG. 4 to perform at least a part of the AI processing.

The AI processing may include all the operations related to optimal beam selection of the intelligent computing device 10 illustrated in FIG. 5. For example, the AI processing may be a process of analyzing data obtained through an input unit of the intelligent computing device 10 and recognizing new data.

The AI device 20 may include an AI processor 21, a memory 25, and/or a communication unit 27.

The AI device 20 is a computing device capable of learning a neural network and may be implemented as various electronic devices such as a server, a desktop PC, a notebook PC, and a tablet PC.

The AI processor 21 may learn a neural network using a program stored in the memory 25.

Particularly, the AI processor 21 may train a neural network for recognizing new data by analyzing data obtained through the input unit. The neural network for recognizing data may be designed to emulate a human brain's structure on a computer, and may include a plurality of network nodes having weights that emulate neurons in a human neural network.

The plurality of network nodes may send and receive data according to each connection relationship so that neurons emulate the synaptic activity of neurons sending and receiv- ing signals through synapses. Herein, the neural network may include a deep learning model which has evolved from a neural network model. In the deep learning model, a plurality of network nodes may be arranged in different layers and may send and receive data according to a con- volution connection relationship. Examples of the neural network model may include various deep learning tech- niques, such as deep neural networks (DNN), convolutional deep neural networks (CNN), recurrent Boltzmann machine (RNN), restricted Boltzmann machine (RBM), deep belief networks (DBN), and deep Q-networks, and are applicable to fields including computer vision, voice recognition, natu- ral language processing, and voice/signal processing, etc.

A processor performing the above-described functions may be a general purpose processor (e.g., CPU), but may be AI-dedicated processor (e.g., GPU) for AI learning.

The memory 25 may store various programs and data required for the operation of the AI device 20. The memory 25 may be implemented as a non-volatile memory, a volatile memory, a flash memory, a hard disk drive (HDD), or a solid state drive (SSD), etc. The memory 25 may be accessed by the AI processor 21, and the AI processor 21 may read/ write/modify/delete/update data. Further, the memory 25 may store a neural network model (e.g., deep learning model 26) created by a learning algorithm for data classification/ recognition according to an embodiment of the present invention.

The AI processor 21 may further include a data learning unit 22 for learning a neural network for data classification/ recognition. The data learning unit 22 may learn criteria as to which learning data is used to determine the data classi- fication/recognition and how to classify and recognize data using learning data. The data learning unit 22 may learn a deep learning model by acquiring learning data to be used in the learning and applying the acquired learning data to the deep learning model.

The data learning unit 22 may be manufactured in the form of at least one hardware chip and mounted on the AI device 20. For example, the data learning unit 22 may be manufactured in the form of a dedicated hardware chip for artificial intelligence (AI), or may be manufactured as a part of a general purpose processor (e.g., CPU) or a graphic- dedicated processor (e.g., GPU) and mounted on the AI device 20. Further, the data learning unit 22 may be imple- mented as a software module. If the data learning unit 22 is implemented as the software module (or a program module including instruction), the software module may be stored in non-transitory computer readable media. In this case, at least one software module may be provided by an operating system (OS), or provided by an application.

The data learning unit 22 may include a learning data acquisition unit 23 and a model learning unit 24.

The learning data acquisition unit 23 may acquire learning data required for a neural network model for classifying and recognizing data. For example, the learning data acquisition unit 23 may acquire, as learning data, data to be input to a neural network model and/or feature values extracted from the data.

By using the acquired learning data, the model learning unit 24 may learn so that the neural network model has a criteria for determining how to classify predetermined data. In this instance, the model learning unit 24 may train the neural network model through supervised learning which uses at least a part of the learning data as the criteria for determination. Alternatively, the model learning unit 24 may train the neural network model through unsupervised learning which finds criteria for determination by allowing the neural network model to learn on its own using the learning data without supervision. Further, the model learning unit 24 may train the neural network model through reinforcement learning using feedback about whether a right decision is made on a situation by learning. Further, the model learning unit 24 may train the neural network model using a learning algorithm including error back-propagation or gradient descent.

If the neural network model is trained, the model learning unit 24 may store the trained neural network model in the memory. The model learning unit 24 may store the trained neural network model in a memory of a server connected to the AI device 20 over a wired or wireless network.

The data learning unit 22 may further include a learning data pre-processing unit (not shown) and a learning data selection unit (not shown), in order to improve a result of analysis of a recognition model or save resources or time required to create the recognition model.

The learning data pre-processing unit may pre-process acquired data so that the acquired data can be used in learning for recognizing new data. For example, the learning data pre-processing unit may process acquired learning data into a predetermined format so that the model learning unit 24 can use the acquired learning data in learning for recognizing new data.

Moreover, the learning data selection unit may select data required for learning among learning data acquired by the learning data acquisition unit 23 or learning data pre-processed by the pre-processing unit. The selected learning data may be provided to the model learning unit 24. For example, the learning data selection unit may detect a specific area among feature values of data acquired by the intelligent computing device 10 to select, as learning data, only data for syllable included in the specific area.

In addition, the data learning unit 22 may further include a model evaluation unit (not shown) for improving the result of analysis of the neural network model.

The model evaluation unit may input evaluation data to the neural network model and may allow the model learning unit 22 to learn the neural network model again if a result of analysis output from the evaluation data does not satisfy a predetermined criterion. In this case, the evaluation data may be data that is pre-defined for evaluating the recognition model. For example, if the number or a proportion of evaluation data with inaccurate analysis result among analysis results of the recognition model learned on the evaluation data exceeds a predetermined threshold, the model evaluation unit may evaluate the analysis result as not satisfying the predetermined criterion.

The communication unit 27 may send an external electronic device a result of the AI processing by the AI processor 21.

If the AI processor 21 is included in a network system, the external electronic device may be an intelligent computing device according to an embodiment of the present disclosure.

Although the AI device 20 illustrated in FIG. 5 is described such that it is functionally separated into the AI processor 21, the memory 25, the communication unit 27, etc., the above components may be integrated into one module and may be referred to as an AI module.

FIG. 6 is an exemplary block diagram of an intelligent computing device according to an embodiment of the present disclosure.

An embodiment of the present disclosure may include computer-readable and computer-executable instructions that may be included in the intelligent computing device 10. FIG. 6 illustrates a plurality of components included in the intelligent computing device 10 merely by way of example, and it is obvious that components that are not illustrated in FIG. 6 can be included in the intelligent computing device 10.

An embodiment of the present disclosure may be applied to a plurality of different devices and computer systems, for example, a general purpose computing system, a server-client computing system, a telephone computing system, a laptop computer, a mobile terminal, a PDA, a tablet computer, etc. The intelligent computing device 10 may also be applied as one component of other devices or systems that provide a speech recognition function, for example, automated teller machines (ATMs), kiosks, global positioning systems (GPSs), home appliances (e.g., refrigerators, ovens, washing machines, etc.), vehicles, and e-book readers.

As illustrated in FIG. 6, the intelligent computing device 10 may include a communication unit 110, an input unit 120, an output unit 130, a memory 140, a power supply unit 190, and/or a processor 170. Some of the components disclosed in the intelligent computing device 10 may be a single component and may appear multiple times in one device.

The intelligent computing device 10 may include an address/data bus (not shown) for transmitting data to the components of the intelligent computing device 10. The respective components in the intelligent computing device 10 may be directly connected to other components via the bus (not shown). The respective components in the intelligent computing device 10 may be directly connected to the processor 170.

The communication unit 110 may include a wireless communication device such as radio frequency (RF), infrared, Bluetooth, and wireless local area network (WLAN) (Wi-Fi, etc.), or a wireless network device such as 5G network, long term evolution (LTE) network, WiMAN network, and 3G network.

The input unit 120 may include a microphone, a touch input unit, a keyboard, a mouse, a stylus, or other input units.

The output unit 130 may output information (e.g., speech) processed by the intelligent computing device 10 or other devices. The output unit 130 may include a speaker, a headphone, or other appropriate components that propagate speech. For another example, the output unit 130 may include an audio output unit. Further, the output unit 130 may include a display (visual display or tactile display), an audio speaker, a headphone, a printer, or other output units.

The output unit 130 may be integrated in the intelligent computing device 10, or may be implemented separately from the intelligent computing device 10.

The input unit 120 and/or the output unit 130 may include an interface for connecting external peripherals, such as a universal serial bus (USB), FireWire, thunderbolt, or other connection protocols. The input unit 120 and/or the output unit 130 may include a network connection such as an Ethernet port, modem port, etc. The intelligent computing device 10 may be connected to internet or a distributed computing environment through the input unit 120 and/or the output unit 130. Further, the intelligent computing device 10 may be connected to a removable or external memory (e.g., a removable memory card, memory key drive, network storage, etc.) through the input unit 120 and/or the output unit 130.

The memory 140 may store data and instructions. The memory 140 may include a magnetic storage, an optical storage, a solid-state storage, etc. The memory 140 may include a volatile RAM, a non-volatile ROM, or other memories.

The intelligent computing device 10 may include a processor 170. The processor 170 may be connected to the bus (not shown), the input unit 120, the output unit 130, and/or other components of the intelligent computing device 10. The processor 170 may correspond to a data processing CPU or a data processing memory for storing computer-readable instructions and data.

Computer instructions to be processed by the processor 170 for running the intelligent computing device 10 and its various components may be executed by the processor 170, or stored in the memory 140, an external device, or a memory or storage included in the processor 170 to be described later. Alternatively, all or some of the executable instructions may be added to software and embedded in hardware or firmware. An embodiment of the present disclosure may be implemented by, for example, a variety of combinations of software, firmware, and/or hardware.

FIG. 7 is a flow chart illustrating a method of transmitting and receiving an intelligent signal according to an embodiment of the present disclosure.

As illustrated in FIG. 7, according to an embodiment of the present disclosure, a method for a user equipment (UE) to transmit and receive an intelligent signal comprises steps S710 to S770, and a detailed description thereof is as follows.

First, the UE may receive, from a base station (BS), a request of UE information related to the UE, in S710.

The UE information may be data necessary for the BS and the UE to transmit and receive data/signals in a wireless communication environment.

Subsequently, the UE may transmit the UE information to the BS in response to the request from the BS, in S730.

Next, the UE may acquire a resource allocation for data transmission and reception from the BS, in S750.

Finally, the UE may transmit and receive data with the BS using resources allocated from the BS, in S770. Based on communication characteristics of the UE and the wireless communication environment around the UE, the UE may select a receiver among a general receiver of the UE and an artificial intelligence receiver of the UE, and transmit and receive data with the BS using the selected receiver.

FIG. 8 illustrates a connection establishment procedure between another UE and a base station according to an embodiment of the present disclosure.

As illustrated in FIG. 8, when power is applied, a UE 801 performs a synchronization procedure with a base station 802, in S810.

Subsequently, the base station may transmit, to the UE, a control message requesting information of the UE, in S820.

A message type may be divided into a 'static message' used after synchronization between the base station and the UE and an 'operating message' that can be changed during data transmission and reception.

A static message of the base station may include whether to perform AI support of the UE for specific RAT, and a list of AI-supportable functions (MIMO receiver, channel decoding, modulation relation, End-To-End, etc.).

A static message of the UE may include whether to perform AI support, a list of AI-supportable functions (MIMO receiver, channel decoding, modulation relation, End-To-End, etc.), and AI computing capability of the UE.

Subsequently, an operating message of the base station may include AI application model information (learned model architecture, model weight), model architecture (model configuration of how a model is stacked in which layer), and model weight (weight updated by learning). The model weight may be a message for determining a receiver switching between an artificial intelligence receiver (AI receiver), an existing general receiver (hereinafter, a non-AI PHY. receiver or a general receiver), and an artificial intelligence receiver. The operating message of the base station may further include reception related parameters (e.g., SNR, RSSI, RSRP, etc.) used for learning.

An operating message of the UE may include whether to switch to the AI receiver.

Subsequently, the UE transmits, to the base station, the control message transmitting the information of the UE, in S830.

Next, the base station allocates resources for data transmission and reception to the UE, in S840.

Finally, the UE and the base station transmit and receive data, in S850.

A general communication procedure will be further described below.

The existing wireless communication is configured such that, after synchronization between the UE and the base station, the base station transmits a control message indicating to report a capability for specific radio access technology (RAT) of the UE, and the UE transmits, to the base station, a control message containing its own capability information for the radio access technology indicated by the base station.

Subsequently, the base station transmits, to the UE, resource information for data transmission and reception based on the received information of the UE.

In this instance, the UE controls a portion corresponding to a physical layer operation based on the resource information received by the base station and performs the data transmission and reception.

A general system operation procedure is described as follows.

First, the base station learns initial model information for determining switching between the AI receiver and the general receiver which are to be used for the UE.

Subsequently, the UE transmits and receives data using the general receiver until receiving an AI-related model from the base station.

If the UE supports the AI receiver, the UE receives the AI-related model from the base station, including parameters used for learning the model.

After the UE measures using the reception related parameters (e.g., SNR, RSSI, RSRP, etc.), the UE determines the switching to the AI receiver through a model determining the switching from the general receiver to the AI receiver.

The UE that has determined the switching sends the corresponding determination to the base station through a message.

The UE periodically measures the reception related parameters to collect data, and then relearns a model determining the switching between the general receiver and the AI receiver.

After relearning the switching determination model, the UE inputs the reception related parameters to determine whether or not to maintain the switching. In this instance, if the switching to the AI receiver fails, the UE sends the corresponding determination to the base station through a message and switches from the AI receiver to the general receiver.

FIG. 9 is a flow chart illustrating an initial receiver switching operation procedure according to an embodiment of the present disclosure.

As illustrated in FIG. 9, when power is applied to the UE, a UE 901 performs a synchronization procedure with a base station 902 in S901, receives an information request control message of the UE from the base station, and transmits an information transmission control message of the UE to the base station in S905.

The information transmission control message of the UE includes whether to perform AI support, a list of AI-supports, and AI computing capability.

If it is possible for the UE to use an AI receiver, the UE receives AI-related model information from the base station, in S911. The AI-related model information includes application model information (AI receiver switching determination model) and reception related parameters used for learning.

Next, the UE obtains the AI-related model and learning related parameters from the base station in S912 and measures parameters to be used in a switching determination model in S913. The UE applies the switching determination model and determines whether to switch from a general receiver to an AI receiver, in S914.

For example, if it is determined to switch to the AI receiver in S920, the UE transmits an AI receiver switching/non-switching message to the base station in S921. The AI receiver switching/non-switching message may include data of 'AI receiver switching=TRUE'.

Subsequently, the UE may transmit and receive data with the base station using the AI receiver, in S922.

For example, if it is determined not to switch to the AI receiver, the UE may transmit and receive data with the base station using the general receiver, in S923.

The parameters used for learning may include a control message related parameter in addition to Sync signal, SNR, RSRP, etc. that are PHY. related parameters.

The UE performs periodic measurement of the reception related parameters that the base station uses for learning, and inputs the corresponding data to the switching determination model to check whether or not to switch to the AI PHY. receiver.

FIG. 10 is a flow chart illustrating a procedure, in which a UE switches to an AI receiver and then relearns a model, according to an embodiment of the present disclosure.

As illustrated in FIG. 10, the UE checks reception related parameters used for learning a model for determining the switching from a general receiver to an AI receiver at the base station, and measures the parameters, in S1001. The parameters may be measured differently depending on characteristics of a receiver implemented for each UE and a wireless environment to which the UE currently belongs.

The UE may determine whether the number of the measured parameters is greater than 'A', in S1002. Here, 'A' may be a predetermined number of learning data required for relearning.

When the number of the measured parameters is less than 'A' as a result of determination, the UE performs the step S1001.

When the number of the measured parameters is greater than 'A' as a result of determination, the UE relearns a model required for determining the switching from the general receiver to the AI receiver, in S1003.

Subsequently, the UE checks whether the relearning of the switching determination model has been completed, in S1004.

If the relearning is completed, the UE uses the relearned model, in S1005.

If the relearning is not completed, the UE attempts the relearning of the model after additionally measuring the number 13' of parameters, in S1006. Here, 'B' is a predetermined number of learning data added after initial relearning fails.

Subsequently, the UE decides whether the relearning has been completed, in S1007.

If the relearning is completed, the UE performs the step S1005.

If the relearning is not completed, the UE compares the number of reattempts with 'N', in S1008. Here, 'N' is a predetermined number of reattempts after initial relearning fails.

If the number of reattempts is greater than 'N', the UE initializes the number of measured parameters to zero in S1009 and performs the step S1001.

If the number of reattempts is less than 'N', the UE performs the step S1006.

The number of samples obtained through the reattempt is A+N*B.

For reference, because the base station has received an AI supportable computing capability from the UE, the base station may set and transmit the value after determination.

FIG. 11 illustrates a basic example of K-means clustering.

FIG. 12 illustrates arrangement of parameters measured along the x-y-z axes.

As illustrated in FIGS. 11 and 12, the UE uses clustering in unsupervised learning. The clustering is a method of receiving data and grouping the data into a small number of groups. As illustrated in FIG. 11, after receiving unlabeled data, the UE performs clustering by assigning a label to each data.

An algorithm to implement the clustering includes various methods such as K-means clustering, mean-shift clustering, density-based spatial clustering of applications with noise (DB SCAN), agglomerative hierarchical clustering, etc.

Among the various methods, in K-means clustering, the UE assigns N data $X=\{x1, x2, \ldots, xN\}$ to K cluster $S=\{S1, S2, \ldots, SK\}$ so that a distance between a centroid of cluster to which the data belongs and the data is the smallest. Here, the UE assumes that data belonging to the same cluster is 'close' to each other. In this instance, each cluster has one 'centroid' (1201, 1202, 1211, 1212, 1213) and defines 'how close' each data is to its centroid as a cost. In the K-means, learning is performed in such a method of finding a cluster maximally reducing the cost thus defined.

If the K-means clustering is applied to this technology, the collection number 'A' of parameters that the UE has used to learn the switching determination model may be considered as N, and cluster K=2 can be applied because whether to switch is determined.

For example, in the present disclosure, if the parameters used to learn the switching determination model are three (e.g., SNR, RSSI, and RSRP), the following scenario may be performed to apply the K-means clustering.

First, the UE sets each parameter indicator at the axis (e.g., SNR—x axis, RSSI—y axis, and RSRP—z axis). Subsequently, as illustrated in the upper part of FIG. 12, the UE arranges the measured values (samples) suitably for the axis.

If the learning data exceeds the predetermined number 'A', the UE performs clustering to construct a cluster as illustrated in the lower part of FIG. 12.

When the UE performs the clustering as above, the UE may weight a specific parameter and perform clustering in which samples with good performance of the parameter are grouped.

The UE determines whether or not to switch using the relearned model.

FIG. 13 is a flow chart illustrating a procedure, in which a UE switches to an AI receiver and then performs relearning, according to another embodiment of the present disclosure.

As illustrated in FIG. 13, a UE 1301 may transmit and receive data with a BS 1302 using an AI receiver, in S1301.

The UE measures reception related parameters, in S1302. The reception related parameters may be SNR, RSSI, and RSRP.

Next, the UE compares the number of reception related parameters required for relearning with 'A' in S1310, and relearns a switching determination model using the reception related parameters when the number of reception related parameters is greater than 'A' in S1311.

The UE determines whether the number of relearnings of the switching determination model exceeds zero, in S1320.

If the number of relearnings is greater than zero, the UE may apply the reception related parameters as an input to the switching determination model, in S1321.

If it is determined to switch to the AI receiver, the UE may transmit and receive data with the base station while maintaining the use of the AI receiver, in S1322.

If it is determined not to switch to the AI receiver, the UE transmits an AI receiver switching/non-switching message to the base station, in S1323. The AI receiver switching/non-switching message includes information of 'AI receiver switching=FALSE'.

If the UE determines that the number of relearnings of the switching determination model is zero in S1324, the UE transmits and receives data with the base station using a general receiver in S1325.

Hereinafter, an example of applying a clustering method to a switching determination model between receivers according to the present disclosure is described with reference to FIGS. 14 to 23.

FIG. 14 illustrates a process of generating an AI receiver model.

FIG. 15 illustrates a process of generating a switching determination model between an AI receiver and a general receiver.

As illustrated in FIGS. 14 and 15, a UE/BS implements performance close to a maximum likelihood detector (MLD) using machine learning/deep learning from a MIMO detection perspective of the UE at the base station, and generates an AI PHY. receiver model that achieves optimal reception performance with low computational complexity. In the model, in order to learn including channel characteristics, Channel matrix H is selected as an input value and proceeds.

The base station generates a model required to switch the AI PHY. receiver for MIMO detection and the existing UE receiver (no AI applied). Examples of an input value for learning at the base station may include the number of transmit and receive antennas, signal-to-noise ratio (SNR), frequency variation measurement (unit: Hz) due to the Doppler effect according to UE movement, delay spread (unit: ns), pilot signal strength (RSRP), and the like.

The learning is performed, considering an environment where it is difficult for the UE to acquire labeled data, using unsupervised learning or reinforcement learning that does not use the labeled data, and thus the UE can perform relearning. For example, when it is assumed that the signal-to-noise ratio (SNR), the frequency variation measurement (unit: Hz) due to the Doppler effect according to UE movement, and the delay spread (unit: ns) are used as the input value, and the learning method uses k-means clustering of unsupervised learning, the model may be learned as in an example of the slide 7.

Here, the UE first sets each parameter indicator at an axis. The arrangement of axes may be arbitrarily determined (e.g., SNR—x axis, frequency variation measurement (Hz)—y axis, and delay spread—z axis). Further, the UE arranges the measured values (samples) suitably for the axis and then performs clustering to generate a learning model.

FIG. 16 illustrates one clustering to which a switching determination model according to the present disclosure is applied.

FIG. 17 illustrates UE information according to the present disclosure.

FIG. 18 illustrates AI-related model information according to the present disclosure.

FIG. 19 is a flow chart illustrating an operating based on a switching determination result according to the present disclosure.

Following the description of FIG. 15, in FIG. 17, at a UE 1701 and a BS 1702, after application of power to the UE (S1701) and synchronization (S1702), the BS requests information of the UE (S1703) and then the UE transmits the information to the BS (S1704). In this instance, the UE transmits whether to perform AI support and a list of AI supports when the AI support is possible (e.g., MIMO, QAM detector, etc.), and also transmits AI computing capability of the UE.

Subsequently, in FIG. 18, a BS 1802 determines whether to use an AI model based on received UE information of a UE 1801. Since the UE 1801 supports MIMO in the received information, the UE transmits a pre-learned MIMO detection related AI PHY. receiver and an AI PHY. receiver switching determination model based on the number of antennas.

The base station transmits AI-related model information to the UE, in 51801.

The UE stores the received AI model and measures a parameter for determining whether to switch. Subsequently, the UE inputs the measured parameter as an input value to the AI PHY. receiver switching determination model and checks a result.

In FIG. 16, if it is assumed that a location corresponding to cluster 2 (1402) is determined as the result indicating the receiver switching and the result value is output as "switchable", when three measured values are put as an input, they are represented as one point in three-dimension (1605). The UE checks how far the corresponding point is from centroids of two clusters and selects the cluster that is closer among the two clusters. As a result, the UE selects the cluster 2 and outputs the "switchable".

In FIG. 19, if the switching is determined, a UE 1901 sends, to a BS 1902, a message (S1902) that the receiver switches from a general receiver to an AI receiver, and then performs data transmission and reception using the AI receiver (S1903).

If it is determined not to switch to the AI receiver, the UE transmit and receive data with the BS using the general receiver, in 51904.

FIG. 20 illustrates an example where a base station transmits AI-related model information to a UE.

As illustrated in FIG. 20, if a UE 2001 determines that an AI receiver is available, a BS 2002 transmits AI-related model information to the UE 2001, in 52001. The AI-related model information may include a switching determination model related to MIMO detection, parameters used in learning a switching determination model (SNR, frequency variation measurement, delay spread), the number of initial relearning parameters (A), the number of additional measurement parameters (B) if relearning fails, and the number of additional attempts (N) if relearning fails.

The UE switching to the AI receiver performs an operation for relearning the receiver switching determination model.

The UE learns each of the parameters of SNR, frequency variation measurement (Hz) due to the Doppler effect according to UE movement, and delay spread (ns) A times and attempts the relearning of the switching determination model.

FIG. 21 illustrates a cluster whose a centroid is changed after relearning.

As illustrated in FIG. 21, as a result of performing relearning, a position of a centroid of the existing cluster may be changed based on the measured parameter. That is, centroids of clusters 2101 and 2102 may be changed from their original position to X-marked parts of divided clusters 2103, 2104, and 2105.

FIG. 22 is a flow chart illustrating an example of an operation of a UE after relearning.

As illustrated in FIG. 22, since relearning has been completed more than once, the UE measures parameters and determines whether to switch a receiver.

The UE checks a result 2211 when the parameters as the input value are put into the relearned model, and checks how far the corresponding point is from the centroid of the cluster to determine whether to switch the receiver.

As a result of determination, since it is closer to a centroid 2211 of the cluster 2, an output value is output as "switchable", and the UE transmits and receives data while maintaining the use of the AI receiver, in S2201 and 2202.

FIG. 23 is a flow chart illustrating another example of an operation of a UE after relearning.

As illustrated in FIG. 23, when the UE inputs measured parameters as input values, the UE has to switch a receiver from an AI receiver to a general receiver if it is closer to a centroid 2311 of the cluster 1. Therefore, the UE transmits, to the base station, a message that the general receiver is used. The UE initializes the number of relearnings of the switching determination model to zero, and then performs data transmission and reception using the general receiver, in S2301, 2303, and 2305.

The present disclosure described above can be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

The invention claimed is:

1. A method of a user equipment (UE) for receiving an intelligent signal from a base station (BS), the method comprising:

receiving, from the BS, a request of UE information related to the UE;

transmitting, to the BS, the UE information;

allocating, by the BS, a resource for data transmission and reception; and transmitting and receiving data with the BS based on the allocated resource, wherein transmitting and receiving the data comprises transmitting and receiving the data based on a receiver selected among a general receiver of the UE and an artificial intelligence (AI) receiver of the UE based on wireless communication environment information of the UE, wherein the method further comprises:

based on it being determined that the UE is able to use the AI receiver:

transmitting, to the BS, a request of AI-related model information; and receiving, from the BS, the AI-related model information, wherein the AI-related model information includes at least one of a switching determination model, and reception related parameters used for learning, wherein the method further comprises:

after receiving the AI-related model information, measuring parameters used in a switching determination model; and selecting one among the general receiver and the AI receiver based on the measured parameters and the switching determination model.

2. The method of claim 1, wherein the wireless communication environment information of the UE includes at least one of SNR information, frequency variation measurement information, or delay spread information of the UE.

3. The method of claim 1, wherein the request of the AI-related model information includes at least one of information for whether to perform an AI support, information for a list of AI supports, and information for an AI computing capability.

4. The method of claim 1, wherein, based on a number of the measured parameters being less than or equal to a preset threshold, measuring the parameters is repeated.

5. The method of claim 4, further comprising:

based on the number of the measured parameters being greater than the preset threshold, relearning the switching determination model.

6. The method of claim 5, further comprising:

based on the relearning being completed, adding parameters as many as a preset number of parameters and measuring the added parameters.

7. The method of claim 6, wherein, based on the measurement of the added parameters being completed, the relearning is repeated by a preset number of reattempts.

8. An intelligent computing device for intelligently receiving a signal from a base station (BS), the intelligent computing device comprising:

a communication unit configured to receive, from the BS, a request of user equipment (UE) information related to a UE; and a processor configured to transmit the UE information to the BS through the communication unit, allow the BS to allocate a resource for data transmission and reception, and transmit and receive data with the BS based on the allocated resource, wherein the processor is further configured to transmit and receive the data based on a receiver selected among a general receiver of the UE and an artificial intelligence (AI) receiver of the UE based on wireless communication environment information of the UE, wherein, based on it being determined that the UE is able to use the AI receiver, the processor is further configured to:

transmit, to the BS, a request of AI-related model information; and receive, from the BS, the AI-related model information, wherein the AI-related model information includes at least one of a switching determination model, and reception related parameters used for learning, wherein the processor is further configured to, after receiving the AI-related model information:

measure parameters used in a switching determination model; and select one among the general receiver and the AI receiver based on the measured parameters and the switching determination model.

9. The intelligent computing device of claim 8, wherein the wireless communication environment information of the UE includes at least one of SNR information, frequency variation measurement information, or delay spread information of the UE.

10. The intelligent computing device of claim 8, wherein the request of the AI-related model information includes at least one of information for whether to perform an AI support, information for a list of AI supports, and information for an AI computing capability.

11. The intelligent computing device of claim 8, wherein the processor is further configured to, based on a number of the measured parameters being less than or equal to a preset threshold, repeat the measurement of the parameters.

12. The intelligent computing device of claim 11, wherein the processor is further configured to, based on the number of the measured parameters being greater than the preset threshold, relearn the switching determination model.

13. The intelligent computing device of claim 12, wherein the processor is further configured to, based on the relearning being completed, add parameters as many as a preset number of parameters and measure the parameters.

* * * * *